(12) United States Patent
Thieme et al.

(10) Patent No.: US 8,193,127 B2
(45) Date of Patent: Jun. 5, 2012

(54) LOW RESIDUE FLUID FRACTURING SYSTEM AND METHOD OF USE

(75) Inventors: Karena Thieme, Calgary (CA); Sally Lawrence, Calgary (CA)

(73) Assignee: Sanjel Corporation, Calgary, Alberta (CA)

( * ) Notice: Subject to any disclaimer, the term of this patent is extended or adjusted under 35 U.S.C. 154(b) by 525 days.

(21) Appl. No.: 12/365,586

(22) Filed: Feb. 4, 2009

(65) Prior Publication Data
US 2009/0209438 A1 Aug. 20, 2009

Related U.S. Application Data

(60) Provisional application No. 61/026,036, filed on Feb. 4, 2008, provisional application No. 61/059,205, filed on Jun. 5, 2008.

(51) Int. Cl.
*E21B 43/26* (2006.01)
(52) U.S. Cl. .................. 507/266; 166/308.1; 166/308.3
(58) Field of Classification Search .................. 507/266; 166/308.1, 308.3
See application file for complete search history.

(56) References Cited

U.S. PATENT DOCUMENTS

| | | | |
|---|---|---|---|
| 4,180,491 A | 12/1979 | Kim et al. | |
| 4,615,825 A | 10/1986 | Teot et al. | |
| 5,258,137 A | 11/1993 | Bonekamp et al. | |
| 5,807,812 A * | 9/1998 | Smith et al. | 507/238 |
| 6,035,936 A | 3/2000 | Whalen | |
| 6,258,859 B1 | 7/2001 | Dahayanake et al. | |
| 6,482,866 B1 | 11/2002 | Dahayanake et al. | |
| 6,506,710 B1 | 1/2003 | Hoey et al. | |
| 6,908,888 B2 | 6/2005 | Lee et al. | |
| 7,084,095 B2 | 8/2006 | Lee et al. | |
| 2003/0236174 A1 | 12/2003 | Fu et al. | |
| 2004/0063587 A1 | 4/2004 | Horton et al. | |
| 2005/0107503 A1 | 5/2005 | Couillet et al. | |
| 2006/0025321 A1 | 2/2006 | Treybig et al. | |
| 2006/0046937 A1 | 3/2006 | Fu et al. | |
| 2006/0131019 A1 * | 6/2006 | Santra et al. | 166/292 |
| 2006/0247136 A1 * | 11/2006 | Kriegel et al. | 507/226 |
| 2006/0254774 A1 | 11/2006 | Saini et al. | |
| 2007/0034378 A1 | 2/2007 | Welton et al. | |
| 2007/0060482 A1 | 3/2007 | Welton et al. | |
| 2007/0087940 A1 | 4/2007 | Qu et al. | |
| 2007/0213232 A1 | 9/2007 | Hartshorne et al. | |
| 2007/0238624 A1 | 10/2007 | Li et al. | |
| 2007/0281869 A1 | 12/2007 | Drochon et al. | |

FOREIGN PATENT DOCUMENTS

| | | |
|---|---|---|
| CA | 2380311 | 12/1998 |
| CA | 2485777 | 5/2005 |
| CA | 2488260 | 5/2005 |
| CA | 2574003 | 7/2007 |
| EP | 0993334 | 8/2003 |
| GB | 2398310 | 8/2004 |
| GB | 2432177 | 5/2007 |

(Continued)

*Primary Examiner* — Alicia Toscano
(74) *Attorney, Agent, or Firm* — Bennett Jones LLP

(57) ABSTRACT

A fluid system for hydraulic fracturing operations which comprises a low residue fluid that facilitates the clean up of the wellbore following the treatment is disclosed. The system includes a surfactant compound that forms micelles above a critical concentration. Under certain conditions the addition of an associative thickener compound yields a network based on hydrophobic interactions. The resulting viscous fluid can transport proppants, be applied neat or as a foamed or energized system, or used in an acidizing treatment. The fluid system may further include a breaker additive.

38 Claims, 8 Drawing Sheets

FOREIGN PATENT DOCUMENTS

| | | |
|---|---|---|
| WO | 99/50529 | 7/1999 |
| WO | 2005/059059 | 6/2005 |
| WO | 2005/071038 | 8/2005 |
| WO | 2006/059257 | 6/2006 |
| WO | 2006/064440 | 6/2006 |
| WO | 2006/003637 | 12/2006 |
| WO | 2007/066269 | 6/2007 |
| WO | WO 2008065173 A2 * | 6/2008 |

* cited by examiner

LOW RESIDUE FLUID FRACTURING SYSTEM AND METHOD OF USE

CROSS REFERENCE TO RELATED APPLICATIONS

This application claims the priority benefit of U.S. Provisional Application No. 61/026,036 filed on Feb. 4, 2008 entitled "Low Residue Fluid Fracturing System and Method of Use", and U.S. Provisional Application No. 61/059,205 filed on Jun. 5, 2008 entitled "Low Residue Fluid Fracturing System and Method of Use", the contents of which are incorporated herein by reference.

FIELD OF THE INVENTION

The present invention relates to low residue fluid fracturing systems.

BACKGROUND OF THE INVENTION

In the oil and gas industry, hydraulic fracturing involves injecting a specially blended fracturing fluid through a wellbore and into a formation under sufficiently high pressure to create fractures, thereby providing channels through which formation fluids such as oil, gas or water, can flow into the wellbore and thereafter be withdrawn. Fracturing fluids are designed to enable the initiation or extension of a fracture and the simultaneous transport of suspended proppant (for example, naturally-occurring sand grains, resin-coated sand, sintered bauxite, glass beads, ultra lightweight polymer beads and the like) into the fracture to keep the fracture open when the pressure is released. The performance and the ability of a fracturing fluid to carry proppant are largely dependent upon its viscous properties. Additional desirable characteristics of a fracturing fluid include the ability to be broken and cleaned out of the fracture following the treatment, good fluid-loss control and low friction pressures during application. Common fracturing fluids are based upon either aqueous or hydrocarbon systems, although aqueous fluids (for example, those based on water-soluble polymers, guar gums and guar derivatives) are generally more popular due to lower costs. While it is possible to increase the viscosities of guar-based fluids by elevating the concentration, a more economical approach involves cross-linking the polymers by applying cross-linking agents.

Polymer-free, water-based fracturing fluids may be prepared using surfactants. Compared to a common gel prepared from guar derivatives, a surfactant-based fracturing fluid minimizes the amount of residue remaining in the formation after the treatment. Depending on the grade of the selected guar polymer, the residue can be significant and impede the success of the fracturing procedure. The residue typically includes not only breakdown products resulting from the enzymatic or oxidative decomposition of the polymer structure following the treatment, but also contamination arising during processing of the guar. While modified guars usually contain fewer contaminants due to additional purification, such contaminants cannot be eliminated completely and economically.

Surfactant-based systems are purely synthetic and thus not dependent on the weather or economically-related changes in the harvest of the raw material (for example, guar beans) which may influence availability on the world market. Surfactant-based systems form stable foams when applied under energized conditions. Compared to guar-based fluids, it is possible to obtain the desired fluid property without the addition of a foaming agent. Energized fluids require less base fluid, allowing for application in water-sensitive formations and decreasing the amount of chemical additives needed for the treatment. The reduced amount of fluid that needs to be flowed-back can be of importance in places where the disposal of waste fluid comprises a significant cost factor.

Surfactant-based fracturing systems are well known and valued for their ability to withstand high shear applications. Preferred surfactants can have a range of ionic character; anionic, non-ionic, cationic and zwitterionic species have all been used successfully. However, some cationic surfactants are toxic and are not readily biodegradable.

Viscous fracturing fluids must also be able to be 'broken', by disruption of the structure that causes the increase in viscosity of the fluid in first place. Depending on the composition of the fluid, this disruption can be achieved either by physical or chemical means. If accomplished by an additive, the additional chemical should have no, or only a minimal effect on the gel performance during the actual treatment, but should react rapidly once the treatment is finalized. It is important that the method allows for a certain degree of control over the time involved in the decrease of the gel strength, whereby the formation temperature and pressure may play a vital role.

Typical breaker additives used in combination with guar based fracturing fluids are oxidizers and enzymes. Oxidizing chemicals like ammonium, potassium or sodium salts of peroxydisulfate cause the radical decomposition of the carbohydrate polymers, reducing their molecular weight and therefore their viscosifying ability. Certain amine based additives are available that can enhance the reactivity of the breakers.

Enzymatic breakers provide a less aggressive way to degrade carbohydrate based polymers. Common enzymes used in the oilfield are hemicellulases. Their application is limited to a smaller pH range (3.5 to 8) and lower temperatures compared to oxidizing breakers.

Surfactant-based fracturing fluids can be applied without breaker, depending solely on either the dilution of the network with formation water or the disruption of the micelles by contact with a sufficient amount of hydrocarbon, to reduce the viscosity of the fluid. However, this approach has the disadvantage that there is no means of control over the duration of the 'break'. Furthermore, it may be less economical due to the increased shut-in time of the well.

Although various fracturing fluids are presently used, there remains a need for fracturing fluid systems which mitigate disadvantages of the prior art formulations.

SUMMARY OF THE INVENTION

In one aspect, the invention comprises a fracturing fluid comprising a base fluid, a surfactant component and an associative thickener, whereby the fluid does not display the desired viscosity without both the surfactant component and the associative thickener.

The surfactant component comprises an anionic surfactant and may further comprise a non-ionic surfactant. The associative thickener comprises a polymer which has at least one hydrophilic group and at least one hydrophobic group. The associative thickener is added at a concentration less than the overlap concentration of the polymer. The fracturing fluid components are readily water soluble. Accordingly, the use of the described fluid may lower the amount of residue left in the formation and the damage to the proppant pack involved. The fracturing fluid may further comprise a breaker.

Therefore, in one aspect, the invention comprises a method of fracturing a subterranean formation penetrated by a well bore, comprising the step of formulating a fracturing fluid comprising micelles networked by a polymer comprising at least one hydrophilic group and at least one hydrophobic component, and pumping the fracturing fluid down the wellbore at a rate and pressure sufficient to initiate or extend a fracture in the formation. The micelles are formed by an anionic surfactant and, optionally, a non-ionic surfactant. In one embodiment, the concentration of the polymer in the fracturing fluid is below the overlap concentration of the polymer. Without restriction to a theory, it is believed the micelles formed by the surfactants disclosed herein are substantially spherical.

In another aspect, the invention comprises a method of fracturing a subterranean formation penetrated by a wellbore, comprising the step of formulating a fracturing fluid comprising micelles networked by a polymer comprising at least one hydrophilic group and at least one hydrophobic component, and pumping the fracturing fluid down the wellbore at a rate and pressure sufficient to initiate or extend a fracture in the formation, wherein the micelles are formed by:

a. an anionic surfactant comprising a compound of formulae I.a to I.f or salts thereof, or mixtures thereof:

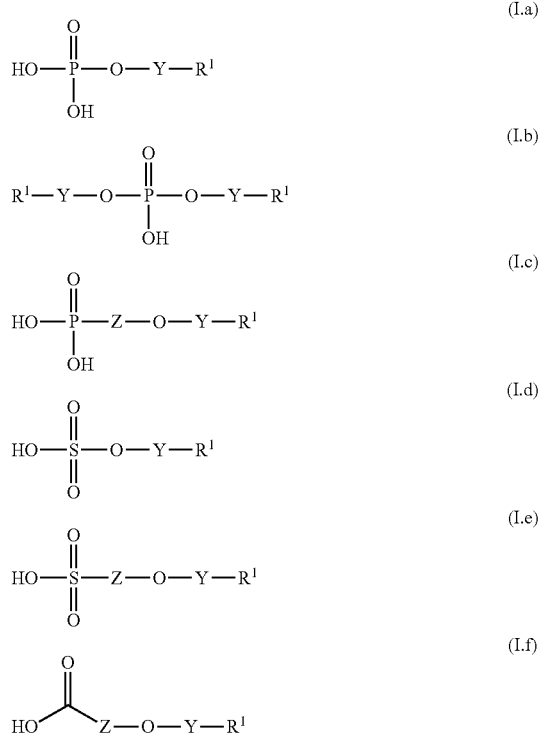

in which:
R$^1$ is selected from linear or branched $C_{16}$-$C_{22}$-alkyl, $C_{16}$-$C_{22}$-alkenyl, $C_{16}$-$C_{22}$-alkynyl, ($C_{15}$-$C_{21}$-alkyl)carbonyl, ($C_{15}$-$C_{21}$-alkenyl)carbonyl and ($C_{15}$-$C_{21}$-alkynyl)carbonyl,
Y is a group consisting of from 1 to 20 alkyleneoxy units and
Z is $C_1$-$C_4$-alkylene, and
b. optionally, a nonionic surfactant,
wherein the total amount of anionic surfactant, nonionic surfactant and polymer forms about 0.1 to about 30% by weight of the fracturing fluid, and the concentration of the polymer is less than the overlap concentration of the polymer.

In another aspect, the present invention comprises the use of the fracturing fluids of the present invention in a method of fracturing a subterranean formation penetrated by a wellbore.

BRIEF DESCRIPTION OF THE DRAWINGS

The invention will now be described by way of an exemplary embodiment with reference to the accompanying simplified, diagrammatic, not-to-scale drawings.

DETAILED DESCRIPTION OF THE INVENTION

Figure 1:
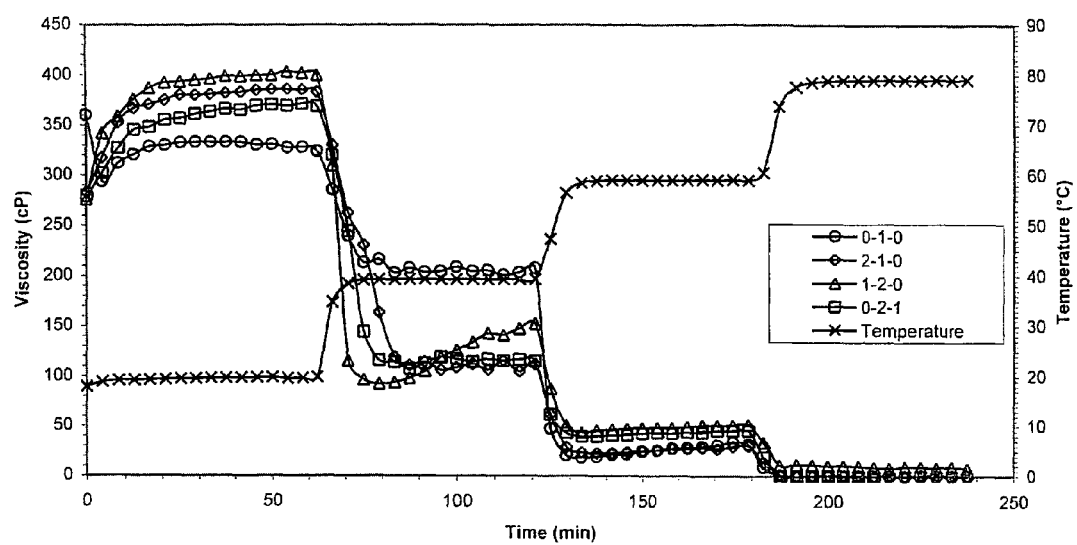
FIG. 1 is a graph showing the viscosity over time at 20-80° C. for gels prepared from mixtures of nonionic (NI) surfactants that differ in the hydrophilicity of the surfactants used.

The present invention provides low residue fluid fracturing systems. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

In one aspect, the present invention comprises an aqueous fluid for use in fracturing a subterranean formation penetrated by a wellbore to aid in the recovery of oil and gas. In one embodiment, the fracturing fluid comprises a base fluid, a surfactant component and an associative thickener. The fracturing fluids do not display the desired viscosity without both the surfactant component and the associative thickener. The surfactant component comprises an anionic surfactant, or a mixture of an anionic surfactant and a non-ionic surfactant.

The base fluid may comprise any aqueous fluid or brine solution such as a potassium chloride or an ammonium chloride solution. Aqueous base fluids are well known in the art and embodiments of the present invention may be implemented with a wide variety of aqueous base fluids. Without restriction to a theory, it is believed the fracturing fluid systems of the present invention involve the formation of spherical micelles by the surfactant component. It is not believed that any rod- or chain-like micelles form.

In one embodiment, the anionic surfactants are selected from compounds of the general formulae (I.a) to (I.f) and salts thereof:

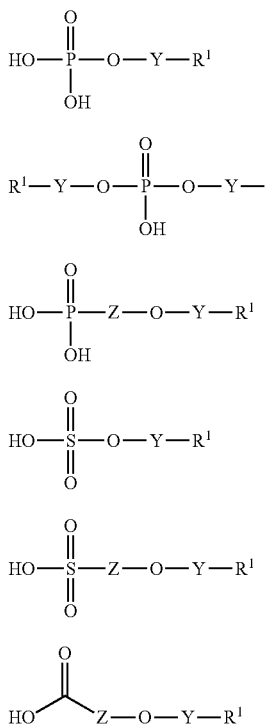

(I.a)
(I.b)
(I.c)
(I.d)
(I.e)
(I.f)

in which:
$R^1$ is selected from linear or branched $C_{16}$-$C_{22}$-alkyl, $C_{16}$-$C_{22}$-alkenyl, $C_{16}$-$C_{22}$-alkynyl, $(C_{15}$-$C_{21}$-alkyl)carbonyl, $(C_{15}$-$C_{21}$-alkenyl)carbonyl and $(C_{15}$-$C_{21}$-alkynyl)carbonyl,
Y is a group consisting of from 1 to 20 alkyleneoxy units and
Z is $C_1$-$C_4$-alkylene.

When the salts of the compounds (I.a) to (I.f) are used, they comprise, as well as the anion of the particular compounds, a corresponding positively charged counterion, for example $Na^+$ or $K^+$.

In the context of the present invention, the expression "alkyl" comprises straight-chain and branched alkyl groups. Suitable short-chain alkyl groups are, for example, straight-chain or branched $C_1$-$C_7$-alkyl, preferably $C_1$-$C_6$-alkyl and more preferably $C_1$-$C_4$-alkyl groups. These include in particular methyl, ethyl, propyl, isopropyl, n-butyl, 2-butyl sec.-butyl, tert.-butyl, etc.

In the context of the present invention, the expression "$C_{11}$-$C_{22}$-alkyl" comprises straight-chain and branched alkyl groups. They are preferably straight-chain and branched $C_{15}$-$C_{20}$-alkyl radicals, more preferably straight-chain and branched $C_{16}$-$C_{18}$-alkyl radicals and most preferably straight-chain $C_{16}$-$C_{18}$-alkyl radicals. They are especially predominantly linear alkyl radicals, as also occur in natural or synthetic fatty acids and fatty alcohols, and also oxo alcohols. They include, for example, n-undecyl, n-dodecyl, n-tridecyl, myristyl, pentadecyl, palmityl (=cetyl), heptadecyl, octadecyl, nonadecyl, arachinyl, behenyl, etc.

In the context of the present invention, $C_{11}$-$C_{22}$-alkenyl, represents straight chain and branched alkenyl groups which may be mono-, di- or polyunsaturated. They are preferably straight-chain and branched $C_{15}$-$C_{20}$-alkenyl, more preferably straight-chain and branched $C_{16}$-$C_{18}$-alkenyl and most preferably straight-chain $C_{16}$-$C_{18}$-alkenyl. They are especially predominantly linear alkenyl radicals, as also occur in natural or synthetic fatty acids and fatty alcohols, and also oxo alcohols. They include in particular octenyl, nonenyl, decenyl, undecenyl, dodecenyl, tridecenyl, tetradecenyl, pentadecenyl, hexadecenyl, heptadecenyl, octadecenyl, nonadecenyl, linolylyl, linolenylyl, eleostearyl, etc., and especially oleyl (9-octadecenyl).

In the context of the present invention, $C_{11}$-$C_{22}$-alkynyl represents straight-chain and branched alkynyl groups which may be mono-, di- or polyunsaturated. They are preferably $C_{15}$-$C_{20}$-alkynyl. They are especially predominantly linear alkynyl radicals.

In the context of the present invention, the term "$C_{11}$-$C_{21}$-alkylcarbonyl" comprises straight-chain and branched alkyl groups as defined above, which are bonded via a carbonyl group (—C(═O)—). The same applies to the terms "$C_{11}$-$C_{21}$-alkenylcarbonyl" and "$C_{11}$-$C_{21}$-alkynylcarbonyl".

The $R^1$ radicals of the compounds of the general formulae (I.a) to (I.f) have, on average, preferably at most one, more preferably at most 0.5 and especially at most 0.2 branch. In particular, the $R^1$ radicals are each independently selected from palmityl, stearyl, oleyl, linoleyl, arachidyl, gadoleyl, behenyl, erucyl, isostearyl, 2-hexyldecyl, 2-heptyldecyl, 2-heptylundecyl and 2-octyldodecyl.

The Y groups in the compounds of the general formulae (I.a) to (I.f) are preferably selected from groups of the general formula (II),

$$—[(O—(CH_2)_2)_{x1}(O—CH(CH_3)CH_2)_{x2}]— \quad (II)$$

in which the sequence of the alkyleneoxy units is as desired and $x^1$ and $x^2$ are each independently an integer from 0 to 20, where the sum of $x^1$ and $x^2$ is from 1 to 20.

The ratio of $x^1$ to $x^2$ averaged over the surfactants of the general formulae (I.a) to (I.f) present is preferably at least 2:1. In a specific embodiment of the inventive composition, the poly(alkyleneoxy) groups of the general formula (II) consist exclusively of ethyleneoxy units and $x^2$ is thus especially 0.

In the compounds of the formulae (I.a) to (I.f), the ratio of the anionogenic groups to the alkyleneoxy units of the $R^1$ groups is preferably within a range of from 1:2 to 1:10. In this connection, anionogenic groups refer to those groups which have an acidic proton and form an anionic group under basic conditions. When, instead of the compounds of the formulae (I.a) to (I.f), their salts are used, the aforementioned ratio relates correspondingly to the anionic groups.

The anionic surfactants are preferably selected from compounds of the general formulae (I.a) or (I.b) and are more preferably selected from compounds of the formula (I.a).

Surfactants of the general formulae (I.a) and (I.b) used in accordance with the invention can, for example, be provided by reacting phosphoric acid or a suitable phosphoric acid derivative, for example $P_2O_5$, $P_4O_{10}$, polyphosphoric acid ($H_3PO_4 \cdot x(HPO_3)_n$ where $n \geq 1$) or metaphosphoric acid (($HPO_3)_n$ where $n>3$), with a suitable alkoxylated alcohol of the formula $R^1$—[(O—(CH_2)_2)_{x1}(O—CH(CH_3)CH_2)_{x2}]—OH or mixtures of these alkoxylated alcohols, as are provided especially by reacting natural or synthetic mixtures of fatty alcohols and oxo alcohols with ethylene oxide and/or propylene oxide. As well as inorganic phosphoric acids, this typically affords mixtures of phosphoric monoesters and phosphoric diesters of the general formula (I.a) and (I.b).

The surfactant component of the present invention preferably comprises at least one phosphoric monoester of the general formula (I.a). Preferably at least 50%, more preferably at least 80% and especially at least 90% of the surfactant component present are selected from compounds of the general formula (I.a).

The associative thickener comprises a polymer which has at least one hydrophobic group. The polymer is preferably selected from compounds comprising at least one hydrophobic group and at least one hydrophilic group (α), and preferably selected from compounds comprising at least two hydrophobic radicals $R^2$, which are bonded to one another via a bridging hydrophilic group (α).

The polymers are preferably water-soluble. These water-soluble polymers comprise a hydrophilic group (α), to which the hydrophobic $R^2$ groups are bonded. For this reason, the polymers are simultaneously hydrophobic and hydrophilic. The hydrophobic $R^2$ groups preferably have a structure which corresponds to the hydrophobic $R^1$ groups of the surfactant component.

The rheological properties of the fluid of the present invention are determined by interactions of the polymers, specifically of their hydrophobic $R^2$ groups, with micelles of the surfactants. These interactions are physical hydrophobic-hydrophobic interactions, thus forming overlapping networks.

Surfactants form micelles in water even at very low concentrations. The concentration at which the first micelles are formed is referred to as the critical micelle concentration (cmc). This is typically determined by the surface tension, solubilization, conductivity (in ionic surfactants) or NMR. The anionic surfactants used in the current invention are notable for a relatively high critical micelle concentration. The critical micelle concentration of such anionic surfactants is preferably within a range from 1 to 50 mg/L and more preferably within a range from 15 to 30 mg/L. The ranges specified relate to the concentrations determined at 25° C. for a salt concentration and a pH which correspond to the use conditions. In order to form overlapping networks, the concentration of the surfactant in the thickener compositions is preferably above its critical micelle concentration.

The hydrophobic $R^2$ groups of the polymers comprise, on average, preferably at least 14 and especially at least 16 carbon atoms. The upper limit of the carbon atom number is generally uncritical and is, for example, up to 100, preferably up to 50 and especially up to 35. More preferably, less than 10% of the hydrophobic $R^2$ groups present in the polymers comprise less than 15 and more than 23 carbon atoms.

Preferably, on average, less than 20% and especially less than 5% of the $R^2$ groups present have a carbon-carbon double bond.

The hydrophobic $R^2$ groups are preferably selected from linear and branched $C_{12}$-$C_{22}$-alkyl, $C_{12}$-$C_{22}$-alkenyl or 2-hydroxy($C_{12}$-$C_{22}$-alk-1-yl).

The $R^2$ radicals of the polymers have, on average, preferably at most one, more preferably at most 0.5 and especially at most 0.2 branch. In particular, the $R^2$ radicals are each independently selected from palmityl, stearyl, oleyl, linoleyl, arachidyl, gadoleyl, behenyl, erucyl, isostearyl, 2-hexyldecyl, 2-heptyldecyl, 2 heptylundecyl, 2-octyldodecyl and 2-hydroxypalmityl, 2-hydroxystearyl, 2-hydroxyoleyl, 2-hydroxylinoleyl, 2-hydroxyarachidyl, 2-hydroxygadoleyl, 2-hydroxybehenyl, 2-hydroxyerucyl and 2-hydroxyisostearyl. Preferably at least 70% of the $R^2$ groups present in the polymers are unbranched.

In a specific embodiment, hydrophilic groups (α) which comprise at least two hydrophilic units (β) are used. The hydrophilic units (β) may have identical or different definitions. Identical hydrophilic units (β) are always bonded to one another via a bridging group (γ). Different hydrophilic units (β) may be bonded directly to one another or via a bridging group (γ).

In a preferred embodiment of the present invention, the bridging hydrophilic group (α) comprises, as hydrophilic units (β), polyether units and/or polyvinyl alcohol units.

More preferably, the bridging hydrophilic group (α) consists of polyether units at least to an extent of 90%.

In a specific embodiment of the present invention, the hydrophilic units (β) of the polymers are at least partly selected from polyether units of the general formula (III)

—[(O—(CH$_2$)$_2$)$_{y1}$(O—CH(CH$_3$)CH$_2$)$_{y2}$]—     (III)

in which the sequence of the alkyleneoxy units is as desired and $y^1$ and $y^2$ are each independently an integer from 0 to 300, where the sum of $y^1$ and $y^2$ is from 10 to 300.

The sum of $y^1$ and $y^2$ denotes the number of alkyleneoxy units of this polyether chain and has, averaged over all polyether units of the formula (III) present, preferably a value in the range from 20 to 200, more preferably from 30 to 150.

The ratio of $y^1$ to $y^2$ expresses the ratio of ethyleneoxy to propyleneoxy units. Averaged over the polyether chain of the general formula (III) present, the ratio of $y^1$ to $y^2$ is preferably at least 2:1, more preferably at least 5:1.

Various hydrophilic polyether units are preferably bonded to one another without bridging groups (γ). These include, for example, EO/PO block copolymer units.

In a specific embodiment of the present invention, the polyether chain of the formula (III) consists exclusively of ethyleneoxy units. In this embodiment, $y^2$ is 0.

In a further specific embodiment of the present invention, the hydrophilic groups (α) are composed of hydrophilic units (β) which are bonded to one another via bridging groups (γ), the bridging groups (γ) being structurally different from the repeat units of which the hydrophilic units (β) are composed.

The bridging groups (γ) between the hydrophilic units (β) of the polymer in the fracturing fluid composition are preferably selected from m-valent, preferably 2- to 4-valent, groups containing from 1 to 10 bridging atoms between the flanking bonds, where the m-valent groups has structures which are selected from —OC(=O)—, —C(=O)OC(=O)—, —OC(=O)O—, —OC(=O)NH—, —NC(=O)NH—, alkylene, alkenylene, arylene, heterocyclene, cycloalkylene, where alkylene and alkenylene may be interrupted once or more than once by oxygen, sulfur, —NH— and —N($C_1$-$C_{10}$-alkyl)-, arylene, heterocyclylene and cycloalkylene may be mono- or polysubstituted by $C_1$-$C_4$-alkyl, and m is an integer in the range from 2 to 4. The bridging groups (γ) preferably have —OC(=O)NH— as terminal structural units.

In this context, the term "m-valent group" means that the bridging group (γ) is capable of forming m chemical bonds, where m is an integer and is preferably 2, 3 or 4.

When alkylene or alkenylene is interrupted by one or more, for example 1, 2, 3, 4, 5, 6, 7 or 8 nonadjacent groups which are each independently selected from oxygen, sulfur, —NH— and N($C_1$-$C_{10}$-alkyl)-, the termini of the alkylene or alkenylene group is formed by carbon atoms.

When the m-valent group (γ) has a valency greater than 2, branching of the polymer is enabled. In this case, the polymer may also comprise more than two hydrophobic $R^2$ groups.

The polymer preferably comprises from two to six, more preferably from two to four hydrophobic $R^2$ groups.

The preferred range for the molecular weight of the polymer arises through multiplication of the number of hydrophobic $R^2$ groups present with a value of from 1500 to 8000 g/mol.

The polymers preferably have, on average, a molecular weight in the range from 3000 to 50,000 g/mol, more preferably in the range from 5000 to 30,000 g/mol.

Polymers used in accordance with the invention can, for example, be provided by reacting polyisocyanates, polyols, polyamines, polycarboxylic acids with a suitable alkoxylated alcohol, for example an alkoxylated alcohol of the formula $R^2$—[(O—$(CH_2)_2$)$_{y1}$(O—CH($CH_3$)$CH_2$)$_{y2}$]—OH or mixtures of these alkoxylated alcohols. These alcohols are provided especially by reacting natural or synthetic mixtures of fatty alcohols and oxo alcohols with ethylene oxide and/or propylene oxide. This typically affords mixtures of alcohols with a different number of alkyleneoxy units, which can be used as such. The polymers used in accordance with the invention can likewise be provided by reacting compounds which comprise at least two different functional groups with the aforementioned alcohols. The polymers are preferably provided starting from polyisocyanates or polyols.

Suitable polyisocyanates, especially diisocyanates and triisocyanates, for providing polymers are the aliphatic, cycloaliphatic, araliphatic and aromatic di- or polyisocyanates mentioned below by way of example. These preferably include 4,4'-diphenylmethane diisocyanate, the mixtures of monomericdiphenylmethanediisocyanates and oligomericdiphenylmethanediisocyanates (polymer-MDI), tetramethylenediisocyanate, tetramethylenediisocyanatetrimers, hexamethylenediisocyanate, hexamethylenediisocyanatetrimers, isophoronediisocyanatetrimer, 4,4'-methylenebis(cyclohexyl) diisocyanate, xylylenediisocyanate, tetramethylxylylenediisocyanate, dodecyldiisocyanate, lysine alkyl ester diisocyanate where alkyl is $C_1$-$C_{10}$-alkyl, 1,4-diisocyanato-cyclohexane or 4-isocyanatomethyl-1,8-octamethylene diisocyanate, and more preferably hexamethylenediisocyanate and 4,4'-diphenylmethane diisocyanate.

Suitable diols for providing the polymers are straight-chain and branched, aliphatic and cycloaliphatic alcohols having generally from about 1 to 30, preferably from about 2 to 20 carbon atoms. These include 1,2-ethanediol, 1,2-propanediol, 1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, 2,3-pentanediol, 2,4-pentanediol, 1,2-hexanediol, 1,3-hexanediol, 1,4-hexanediol, 1,5-hexanediol, 1,6-hexanediol, 2,5-hexanediol, 1,2-heptanediol, 1,7-heptanediol, 1,2-octanediol, 1,8-octanediol, 1,2-nonanediol, 1,9-nonanediol, 1,2-decanediol, 1,10-decanediol, 1,12-dodecanediol, 2-methyl-1,3-propanediol, 2-methyl-2-butyl-1,3-propanediol, 2,2-dimethyl-1,3-propanediol, 2,2-dimethyl-1,4-butanediol, pinacol, 2-ethyl-2-butyl-1,3-propanediol, diethylene glycol, triethylene glycol, dipropylene glycol, tripropylene glycol, polyalkylene glycols, cyclopentanediols, cyclohexanediols, etc.

Suitable triols for providing the polymers are, for example, glycerol, butane-1,2,4-triol, n-pentane-1,2,5-triol, n-pentane-1,3,5-triol, n-hexane-1,2,6-triol, n-hexane-1,2,5-triol, trimethylolpropane, trimethylolbutane. Suitable triols are also the esters of hydroxycarboxylic acids with trihydric alcohols. They are preferably triglycerides of hydroxycarboxylic acids, for example lactic acid, hydroxystearic acid and ricinoleic acid. Also suitable are naturally occurring mixtures which comprise hydroxycarboxylic acid triglycerides, especially castor oil. Preferred triols are glycerol and trimethylolpropane.

Suitable higher polyhydric polyols for providing polymers are, for example, sugar alcohols and derivatives thereof, such as erythritol, pentaerythritol, dipentaerythritol, treitol, inositol and sorbitol. Also suitable are reaction products of the polyols with alkylene oxides, such as ethylene oxide and/or propylene oxide. It is also possible to use higher molecular weight polyols with a number-average molecular weight in the range from about 400 to 6000 g/mol, preferably from 500 to 4000 g/mol. These include, for example, polyesterols based on aliphatic, cycloaliphatic and/or aromatic di-, tri- and/or polycarboxylic acids with di-, tri- and/or polyols, and also the polyesterols based on lactone. These further include polyetherols which are obtainable, for example, by polymerizing cyclic ethers or by reacting alkylene oxides with a starter molecule. These further also include customary polycarbonates with terminal hydroxyl groups which are known to those skilled in the art and are obtainable by reacting the above-described diols or else bisphenols, such as bisphenol A, with phosgene or carbonic esters. Also suitable are α,ω-polyamidols, α,ω)-polymethyl(meth)acrylatediols and/or α,ω-polybutyl (meth)acrylatediols, for example MD-1000 and BD-9000 from Goldschmidt.

Suitable dicarboxylic acids for providing polymers are, for example, oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid, phthalic acid, isophthalic acid, terephthalic acid and mixtures thereof.

The abovementioned dicarboxylic acids may also be substituted. Suitable substituted dicarboxylic acids may have one or more radicals which are preferably selected from alkyl, cycloalkyl and aryl, as defined at the outset. Suitable substituted dicarboxylic acids are, for example, 2-methylmalonic acid, 2-ethylmalonic acid, 2-phenylmalonic acid, 2-methylsuccinic acid, 2-ethylsuccinic acid, 2-phenylsuccinic acid, itaconic acid, 3,3-dimethylglutaric acid, etc.

Dicarboxylic acids can be used either as such or in the form of derivatives. Suitable derivatives are anhydrides and their oligomers and polymers, mono- and diesters, preferably mono- and dialkyl esters, and acid halides, preferably chlorides. Suitable esters are mono- or dimethyl esters, mono- or diethyl esters, and also mono- and diesters of higher alcohols, for example n-propanol, iso-propanol, n-butanol, iso-butanol, tert-butanol, n-pentanol, n-hexanol, etc, and also mono- and vinyl esters and mixed esters, preferably methyl ethyl esters.

Preferred polycarboxylic acids for providing the polymers are succinic acid, glutaric acid, adipic acid, phthalic acid, isophthalic acid, terephthalic acid or their mono- or dimethyl esters. Particular preference is given to adipic acid.

Suitable polyamines are, for example, ethylenediamine, propylenediamine, diethylenetriamine, triethylenetetramine, tetraethylenepentamine, polyethyleneimine, 1,3-propanediamine, N,N-bis(aminopropyl)amine, N,N,N-tris(aminoethyl)amine, N,N,N',N'-tetrakis(aminoethyl)ethylenediamine, N,N,N',N'',N''-pentakis(aminoethyl)-diethylenetriamine, neopentanediamine, hexamethylenediamine, octamethylenediamine or isophoronediamine.

Further compounds suitable for providing the polymers are compounds which comprise at least two different functional groups, for example ethanolamine, N-methylethanolamine, propanolamine, hydroxyacetic acid, lactic acid, glutamic acid, aspartic acid.

In a particularly preferred embodiment, the polymer is provided proceeding from (a) $C_{14}$-$C_{22}$ fatty alcohol ethoxylates and mixtures thereof, (b) polyethylene glycol, EO-PO copolymers, trimethylolpropaneethoxylates/trimethylolpropanepropoxylates, glycerylethoxylates/propoxylates and mixtures thereof, and (c) hexamethylenediisocyanates.

In a further particularly preferred embodiment, the polymer is provided proceeding from (a) polyethylene glycol, EO-PO copolymers, trimethylolpropaneethoxylates/trimethylolpropanepropoxylates, glycerylethoxylates/propoxylates and mixtures thereof, and (b) 1,2-epoxy-$C_{14}$-$C_{22}$-alkanes and mixtures thereof.

The inventive fluids may, as well as the anionic surfactant and the polymer, comprise further components.

In a preferred embodiment of the present invention, the fracturing fluid additionally comprises a co-surfactant, which may comprising at least one linear or branched $C_4$-$C_{18}$-monoalcohol. Co-surfactants have extremely small headgroups, smaller than the surfactant it is added to, and generally insert into micellar solutions to relieve packing stress as a result of their smaller headgroup size. The monoalcohol co-surfactants have preferably at most one branch. When a plurality of $C_4$-$C_{18}$-monoalcohols is present, they have on average preferably at most 0.5 and more preferably at most 0.2 branch. Preferred $C_4$-$C_{18}$ monoalcohols are, for example, n-hexanol, n-heptanol, n-octanol, n-nonanol, n-decanol, n-undecanol and n-dodecanol. In one embodiment, the co-surfactant comprises 2-ethylhexanol or n-octanol.

In this embodiment, the fracturing fluids comprise advantageously an amount of co-surfactant in the range from 0.1 to 20% by weight, preferably from 0.5 to 15% by weight and more preferably from 1 to 8% by weight based on the total weight of the components other than water in the fracturing fluid.

In one embodiment, the fracturing fluid additionally comprises at least one non-ionic surfactant of the general formula (IV)

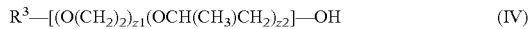

$$R^3—[(O(CH_2)_2)_{z1}(OCH(CH_3)CH_2)_{z2}]—OH \quad \text{(IV)}$$

in which:
the sequence of the alkyleneoxy units is as desired,
$R^3$ is selected from $C_{12}$-$C_{22}$-alkyl, $C_{12}$-$C_{22}$-alkenyl, $C_{12}$-$C_{22}$-alkynyl, ($C_{11}$-$C_{21}$-alkyl)-carbonyl, ($C_{11}$-$C_{21}$-alkenyl)carbonyl and ($C_{11}$-$C_{21}$-alkynyl)carbonyl, and
$z^1$ and $z^2$ are each independently an integer from 0 to 20, where the sum of $z^1$ and $z^2$ is from 1 to 20.

The $R^3$ radicals of the non-ionic surfactants of the general formula (IV) preferably have on average at most one, more preferably at most 0.5 and in particular at most 0.2 branch. In particular, the $R^3$ radicals are each independently selected from palmityl, stearyl, oleyl, linoleyl, arachidyl, gadoleyl, behenyl, erucyl, isostearyl, 2-hexydecyl, 2-heptyldecyl, 2-heptylundecyl and 2-octyldodecyl.

In one embodiment, the non-ionic surfactants have a (poly) alkyleneoxy group which consists of $z^1$ ethyleneoxy and $z^2$ propyleneoxy groups joined to one another in any sequence.

Non-ionic surfactants of the general formula (IV) used in accordance with the invention are, for example, provided by reacting natural or synthetic mixtures of fatty alcohols and oxo alcohols with ethylene oxide and/or propylene oxide. This typically affords mixtures of compounds of the formula (IV) with a different number of alkyleneoxy units. These may be used as mixtures in the inventive compositions.

The sum of $z^1$ and $z^2$ averaged over the compounds of the general formula (IV) present is preferably in the range from 1 to 10 and more preferably in the range from 3 to 9. Specifically, each non-ionic surfactant of the general formula (IV) present in the thickener composition has, for the sum of $z^1$ and $z^2$, a value in the range from 1 to 10 and more preferably a value in the range from 3 to 9.

The ratio of $z^1$ to $z^2$ averaged over the non-ionic surfactants of the general formula (IV) present is preferably at least 2:1. In a specific embodiment of the inventive fluid composition, the (poly)alkyleneoxy groups of the surfactants of the general formula (IV) consist exclusively of ethyleneoxy units and $z^2$ is therefore especially 0.

Embodiments of the non-ionic surfactant may be hydrophilic or hydrophobic in nature. For example, if the number of polyethoxy units (n) attached to the alkyl chain is greater than about 13, the non-ionic surfactant may be considered hydrophilic. If n<13, the surfactant may be considered hydrophobic.

In a further specific embodiment, the fracturing fluid additionally comprises at least one water miscible solvent, other than the monoalcohol co-surfactant. The solvent preferably has a molecular weight of less than 400 g/mol. Suitable water-miscible solvents are, for example, homo- and heterooligomers of ethylene oxide and/or propylene oxide, for example ethylene glycol or propylene glycol, alcohols, e.g. methanol, ethanol, iso-propanol, butylmonoglycol, butyldiglycol, butyltriglycol, phenoxyethanol, phenoxypropanol or o-sec-butylphenol, N-alkylpyrrolidones such as N-methylpyrrolidone, and alkylene carbonates.

In one embodiment, the fracturing fluid is pH adjusted to a slight acidic value, using a suitable acid such as hydrochloric acid or acetic acid. In one embodiment, the pH of the fracturing fluid is between about 4 and 5.

The addition of a polymer associative thickener to the surfactant component of the present invention leads to the formation of interactions between the polymer and the micelles formed by the anionic surfactant and the non-ionic surfactant (if present). The resulting micellar network results in the increase in viscosity of the fracturing fluid.

In one embodiment, the associative thickener is applied at a concentration below the polymer overlap concentration, c*, preferably at least 0.1 c*, and more preferably within a range of about 0.2 to 0.7 c*. The polymer overlap concentration is obtained by plotting the log of the zero shear viscosity of the polymer fluid as a function of the log of its concentration (without a surfactant component), as defined in United States Patent Application No. 2005/0107503, the contents of which are incorporated herein by reference, where permitted. The curve will define three distinct slopes having two intersecting points, each referred to as a break point. The more dilute break point is the overlap concentration of the polymer, while the less dilute break point is the entanglement concentration.

The total amount of "active material" (the combined surfactant component and associative thickener) may be varied to achieve a desired viscosity or other properties of the fluid, and may range from 0.1 to 30 wt %. In one embodiment, the active material may comprise from about 0.5 wt % to about 5.0 wt % of the fluid. In one embodiment, the active material may comprise about 1.0 wt % to about 4.0 wt % of the fluid. In one preferred embodiment, the active material may comprise about 2.0 wt % of the fluid.

The ratio of anionic and non-ionic surfactant to associative thickener may also be varied with successful results. In one embodiment, the ratio of anionic and non-ionic surfactant to associative thickener may be about 1:1 to about 100:1 by weight. In one preferred embodiment, the ratio of surfactant to associative thickener may be about 9:1 by weight.

The fracturing fluids of the present invention display particular properties which make them suitable hydraulic fracturing fluids. In one embodiment, the fracturing fluid is not viscoelastic. The property of viscoelasticity in general is well known and reference is made to S. Gravsholt, Journal of Coll. And Interface Sci., 57(3), 575 (1976); Hoffmann et al., "Influence of Ionic Surfactants on the Viscoelastic Properties of Zwitterionic Surfactant Solutions", Langmuir, 8, 2140-2146 (1992); and Hoffmann et al., The Rheological Behaviour of Different Viscoelastic Surfactant Solutions, Tenside Surf. Det., 31, 389-400, 1994. Of the test methods specified by these references to determine whether a liquid possesses viscoelastic properties, one test which has been found to be useful in determining the viscoelasticity of an aqueous solution consists of swirling the solution and visually observing whether the bubbles created by the swirling recoil after the swirling is stopped. Any recoil of the bubbles indicates viscoelasticity. Another useful test is to measure the storage modulus (G') and the loss modulus (G") at a given temperature. If G'>G" at some point or over some range of points below about 10 rad/sec, typically between about 0.001 to about 10 rad/sec, more typically between about 0.1 and about 10 rad/sec, at a given temperature and if $G'>10^{-2}$ Pascals, preferably $10^{-1}$ Pascals, the fluid is typically considered viscoelastic at that temperature. Rheological measurements such as G' and G" are discussed more fully in "Rheological Measurements", Encyclopedia of Chemical Technology, vol. 21, pp. 347-372, (John Wiley & Sons, Inc., N.Y., N.Y., 1997, 4th ed.). These references are expressly incorporated herein by reference, where permitted.

In one embodiment, useful fracturing fluids may also comprise a breaker. Embodiments of the fracturing fluids of the present invention are sensitive to pH, and the viscosity of the fracturing fluid may be reduced by increasing the pH of the fluid. Therefore, in one embodiment, a liquid alkali can be applied following fracturing treatment. In another embodiment, a precursor material may be added directly to the fracturing fluid, which upon elapsed time or temperature increase the precursor will undergo a physical or chemical reaction forming an alkaline material, leading to an increase in pH and thus the decomposition of the network structure. In one embodiment, the precursor material may comprise an alkaline earth metal oxide such as magnesium or calcium oxide. Upon dissolution in an aqueous medium, the respective alkaline hydroxide is formed: such as $MgO(s)+H_2O(l) \rightarrow Mg(OH)_2(l)$. Since this reaction occurs rapidly upon contact with water it is necessary to delay the process. This can be achieved by decreasing the surface area of the active material utilizing a prill or pellet like formulation. Furthermore it is possible to partially deactivate the active material on the surface during the manufacturing process by physically or chemically applying a coating layer, which dissolves or erodes over time.

In one embodiment, the breaker may comprise magnesium oxide. Magnesium oxides are classified into light burnt magnesium oxide (about 600° to 900° C.) and hard burnt magnesium oxide (about 1,100° to 1,500° C.). The former are generally more reactive.

In another embodiment, breaker in the form of powdered material may be suspended in a hydrocarbon slurry, in which case further control over the release can be achieved by addition of a surface active material to the mixture to alter the properties of the suspension. The latter formulation allows the utilization of an operational setup suitable for the addition of liquid samples as well as the decrease of the impact on health and environment.

Because the viscosifying properties of the fluids of the present invention are based on a network of interlinked surfactant micelles, it is also possible to break the network by addition of a surfactant species that interfere with the micellar structure. Thus, in one embodiment, such breaker surfactants may include non-ionic surfactants based on alkylpolyethylene glycol ethers. The alkyl chain consists of a linear, saturated fatty alcohol, with a chain length of $C_{12}$ to $C_{25}$, preferably $C_{14}$ to $C_{18}$. In one embodiment, the degree of ethoxylation may vary between 10 and 80, and is preferably about 50. The material can be added in solid form (powder or granulates), solution (aqueous), emulsion, encapsulated or as an emulsion of the encapsulated species.

A fracturing fluid of the present invention may be mixed at the surface in a batch or continuous process, and used to treat a wellbore using conventional and well known techniques. In general, the fracturing fluid is mixed at the surface using conventional equipment and techniques. In one embodiment, concentrated solutions of the components described herein may be added to a salt solution as a base fluid to achieve the final desired concentrations. The components may be added in any order. The fluid is then thoroughly mixed to achieve the desired viscosity, and a proppant may be added.

The fluid is then pumped into a wellbore to create a bottomhole pressure sufficient to open a fracture in the formation. The bottomhole pressure is determined by the surface pressure produced by the surface pumping equipment and the hydrostatic pressure of the fluid column in the wellbore, less any pressure loss caused by friction. The minimum bottomhole pressure required is determined by formation properties and therefore will vary from application to application.

The fluid may be used to transport proppants which are well known in the art. The proppants may comprise naturally occurring or man-made particles such as sand, resin-coated proppants, ceramics, bauxite, crushed walnut shells and the like.

The fluid may be foamed or energized using well-known and conventional techniques. Particularly high pumping pressures may be required for foamed systems where the hydrostatic pressure is low due to the presence of gas. Foamed systems include foam or energized fluids, and comprise stable mixtures of gas and liquid, which are mainly used in fracturing low pressure or water sensitive formations. Foam and energized fracturing fluids are generally described by their foam quality, i.e. the ratio of gas volume to the foam volume. If the foam quality is between 52% and 95%, the fluid is usually called foam. Above 95%, a foam is generally changed to mist. Stable dispersion of gas in liquid with foam quality less than 52% is typically called energized fluid. In the present patent application, the term "foamed system" will be used however to describe any stable mixture of gas and liquid, whatever the foam quality is. The foam half-life is another important parameter to evaluate the stability of foam or energized fluids. The half life of a foam or energized fluids is the time necessary for one-half of the liquid used to generate the foam to break out of the foam under atmospheric conditions.

Foamed systems may provide numerous advantages. They expand when they flow back from the well and therefore force the fluid out of the fracture, consequently ensuring a superior clean-up. They typically require less viscosifying agent while presenting good fluid loss control and fluid efficiency. As a result, foamed systems are often cheaper than conventional systems unless the cost benefit due to the use of lower quantities of chemicals is overturned by the need of higher horse power, and consequently of specific pumping equipment.

The fluid fracturing system of the present invention leaves relatively little residue once the viscosity has been broken, whether applied in a foamed system, or not. The amount of residue left by a particular fluid may be determined by permeability regain tests such as those described in the examples below. For a low residue fracturing fluid, a regain permeability of 50% or more is expected, in comparison to values around 25% which are typically observed for a guar-based fluid.

EXAMPLES

The following examples are presented for illustrative purposes only and are not to be interpreted as limiting the claimed invention in any way.

Example 1

The fracturing fluid comprises a mixture of anionic and nonionic surfactants, a polymer associative thickener and n-octanol as a co-surfactant. Initial performance tests showed a stable gel at a temperature of 70° C. and significant pH dependence of the obtained viscosities. The anionic surfactants consisted of a mixture of about 70 mol % $C_{16}$-$C_{18}$-alkyl-(O—$(CH_2)_2)_4$—OP(=O)$(OH)_2$ and 30 mol % of [($C_{16}$-$C_{18}$-alkyl-(O—$(CH_2)_2)_4$)—O]$_2$—P(=O)(OH). The polymer (also referred to herein as the associative thickener) consisted of a 25% solution of a reaction mixture comprising the polymers obtained from the reaction of $C_{16}$-$C_{18}$-alkyl-[(O—$(CH_2)_2)_{140}$]-OH (78% by wt.), PEG 12000 (20% by wt) and hexamethylenedi-isocyanate (2% by wt.), in a mixture of 1,2-propanediol, iso-propanol and water. The non-ionic surfactant consisted of $C_{16}$-$C_{18}$-alkyl-[(O—$(CH_2)_2)_{13}$]—OH.

a) Gel Preparation

A base fluid comprising a brine solution containing 3% potassium chloride was prepared. It is possible to use lower (e.g. 2%) as well as higher (e.g. 7% or higher) salt concentrations. Ammonium chloride may also be suitable. A specified volume of the base fluid was adjusted to a pH of 4.3 using aqueous solutions of either hydrochloric acid (HCl) or acetic acid (AcOH). Under agitation of the solution by applying an overhead stirrer with an impeller blade at a set speed (usually 1000 rpm), the anionic surfactant (IO), the non-ionic surfactant (NI) and the associative thickener (AT) were added as individual and diluted solutions. The order of addition (sequential or simultaneously) does not appear to affect the resulting performance of the resultant gel. Unless otherwise stated, the added quantities were based on a total amount of 2 w % of active material, whereby the ratio of the total amount of surfactant to thickener was 9:1. The ratio of anionic to non-ionic surfactant can be varied depending on the desired application. In order to ensure a homogeneous mixture, the samples were stirred for two minutes so as to mimic the respective mixing time in field operations. All temperature stability tests were carried out on a Brookfield™ PVS Rheometer. The gels were investigated under a constant shear rate of 100 $s^{-1}$, applying a temperature ramp that comprises data collection for 60 minutes at each temperature.

Table 1 shows the viscosities of a gel prepared from 1.4 w % anionic surfactant (IO), 0.4 w % non-ionic surfactant (NI) and 0.2 w % associative thickener (AT) in a 3% solution of KCl in water. Aqueous AcOH was added to obtain a pH of 4.3. The rheological properties at a certain temperature were studied in dependence on the order of addition of the components.

TABLE 1

| | Viscosities [cP] at 100 $s^{-1}$ | | |
| --- | --- | --- | --- |
| | 20° C. | 40° C. | 60° C. |
| IO → NI + AT | 305 | 189 | 35 |
| NI + AT → IO | 238 | 172 | 17 |
| IO + NI + AT | 276 | 178 | 28 |

Different approaches regarding an operational "two-component" mixture were investigated. Possible solutions involved the addition of the buffer solution to the anionic surfactant or the non-ionic surfactant, which can be premixed with the associative thickener component.

b) Variation of the Ratio of Surfactant Components

The influence of the ratio of the non-ionic (NI) to the anionic (IO) surfactant on the gel performance was investigated. The quantity of associative thickener added to the mixture was kept constant, while the amount of buffer was adjusted according to the experimental requirements (Table 2).

TABLE 2

| | | | Viscosities [cP] at 100 $s^{-1}$ | | | | | |
| --- | --- | --- | --- | --- | --- | --- | --- | --- |
| w % IO | w % NI | w % AT | 20° C. | 40° C. | 50° C. | 60° C. | 70° C. | 80° C. |
| 1.5 | 0.3 | 0.2 | 359 | 90 | 56 | 18 | — | — |
| 1.4 | 0.4 | 0.2 | 416 | 218 | 101 | 45 | 21 | 9 |
| 1.3 | 0.5 | 0.2 | 351 | 148 | 91 | 28 | 9 | 2 |

The influence of the hydrophilicity of the non-ionic surfactant was investigated by preparing a premixed solution of varying amounts of surfactant components which differ in the number of polyethoxy units (n) attached to the alkyl chain. The premixed solution included three components, namely the base component (NI, n=13), a hydrophobic version (NI(−), n<13) and a hydrophilic version (NI(+), n>13). The total amount of non-ionic surfactant was kept constant at 0.3 w %, the amount of anionic surfactant at 1.5 w % and the associative thickener at 0.2 w % active material. The results given in Table 3 are also depicted in FIG. 1.

TABLE 3

| ratio NI(−)/NI/NI(+) | Viscosities [cP] at 100 s$^{-1}$ | | | |
|---|---|---|---|---|
| | 20° C. | 40° C. | 60° C. | 80° C. |
| 0-1-0 | 327 | 200 | 34 | — |
| 2-1-0 | 386 | 112 | 30 | — |
| 1-2-0 | 400 | 150 | 55 | 7 |
| 0-2-1 | 370 | 115 | 50 | — | c) Variation of Loadings

The gel performance of fluids prepared with different amounts of active material (surfactants and thickener) was investigated in dependence on temperature. Table 4 summarizes the results obtained for the various gels of the compositions set out below. The amount is defined as weight-percent of the sum of active material relative to the fluid. In one embodiment, an application as low as 0.8 w % active material is possible, depending on the desired temperature range in which the fluid will be used. In addition to tests comprising temperature ramps, standard API procedures have been followed to investigate the stability of the respective gels at certain temperatures (data not shown).

TABLE 4

| Σ w % | w % IO | w % NI | w % AT | Viscosities [cP] at 100 s$^{-1}$ | | | | | |
|---|---|---|---|---|---|---|---|---|---|
| | | | | 20° C. | 40° C. | 50° C. | 60° C. | 70° C. | 80° C. |
| 4.0 | 3.0 | 0.60 | 0.40 | 1481 | 604 | 360 | 259 | 155 | 78 |
| 3.0 | 2.2 | 0.45 | 0.30 | 892 | 150 | 123 | 45 | 10 | — |
| 2.0 | 1.5 | 0.30 | 0.20 | 370 | 117 | 55 | 17 | 5 | — |
| 1.2 | 0.9 | 0.18 | 0.12 | 132 | 36 | 23 | 10 | — | — | d) Shear History

Figure 2:
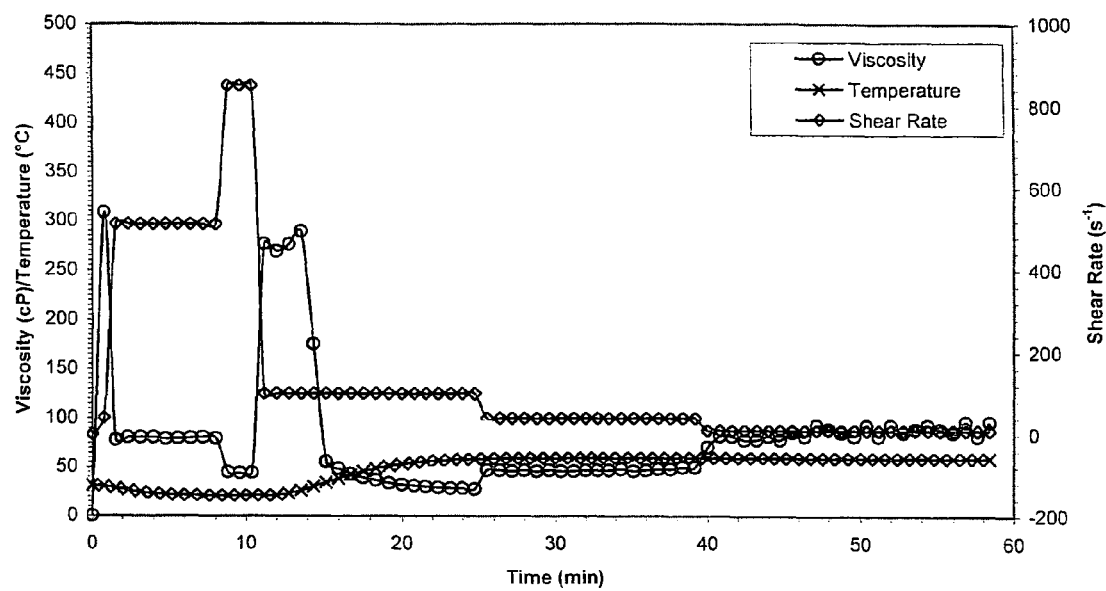
FIG. 2 is a graph showing the viscosity over time from a shear history study in which the fluid comprises 2 w % active material containing an anionic-to-non-ionic surfactant ratio of 4 to 1.

The influence of shear on the quality of the fluid was investigated for a temperature range of 20 to 60° C. The experiment carried out on a Brookfield™ PVS Rheometer which simulates shear conditions a fracturing fluid would encounter when applied operationally. The shear history program comprised high shear rates (511 to 850 s$^{-1}$) at lower temperatures that account for the transport in the wellbore and through the perforations, followed by lower shear (100 to 10 s$^{-1}$) at elevated temperatures that mimic the flow through the fracture itself. The quality or strength of the gel was not hampered by high shear rates (up to 850 s$^{-1}$). Viscosities were found to be higher at low shear rates, though no significant difference was observed for the values obtained for 40 and 11 s$^{-1}$. FIG. 2 provides a graphical representation of the shear history data.

e) Compatibility with Fracturing Sand

Qualitative tests were performed to investigate the compatibility of the fluids with respect to fracturing sand. The experimental setup comprised 100 mL of a fluid prepared according to the above mentioned procedure and quantities. Fracturing sand was added to the viscous fluid under shear. The impact of the addition on the fluid rheology and the settling behaviour upon removal of the shear stress was determined (data not shown). No significant settling of the fracturing sand was observed during the course of the experiment.

Example 2

In this example, the fracturing fluid comprises one anionic surfactant, a polymer associative thickener, and a co-surfactant. The anionic surfactant in this example consisted of a mixture of [C$_{18}$-alkyl-(O—(CH$_2$)$_2$)$_4$—OP(=O)O$_2$]$^{2-}$2Na$^+$ and C$_{18}$-alkyl-(O—(CH$_2$)$_2$)$_4$—OP(=O)(OH)$_2$ with C$_{18}$-alkyl-(O—(CH$_2$)$_2$)$_4$—OP(=O)(OH)$_2$ present in 25 to 50% by weight of active material. The thickener and co-surfactant were identical to that used in Example 1. An acid or base component was used to provide the optimal pH of the brine solution. In one embodiment, the acid is selected from, for example, HCl or AcOH. In one embodiment, the base is selected from, for example, sodium hydroxide (NaOH) or potassium hydroxide (KOH). The gel preparation is similar to the manner described in Example 1, i.e., adding the anionic surfactant and the associative thickener (AT) as individual and diluted solutions. The order of addition (subsequently or simultaneously) does not appear to be detrimental to the resulting performance of the gel. Unless otherwise stated, the added quantities were based on a total amount of 2 w % of active material, whereby the ratio of surfactant to thickener was 9:1. Unless otherwise stated, the gels were prepared in a 3% KCl solution, and the pH adjusted to 4.3 using aqueous AcOH. In order to ensure the presence of a homogeneous mixture, the samples were stirred for two minutes.

a) Gel Preparation

To exclude any influence of the order of addition of the various components, gels were prepared in three different ways. Simultaneously, the temperature range of the experiment was extended to investigate the viscosities at temperatures of up to 80° C. by applying a temperature ramp (stepwise increase of temperature in 10° C. steps) and measuring the viscosities at a shear rate of 100 s$^{-1}$ for a minimum of 30 minutes at each temperature (Table 5). The results indicate that there is no significant influence of the order in which the components are added. This is important for a potential field application and standardisation of the gelation process.

TABLE 5

| | Viscosities [cP] at 100 s$^{-1}$ | | | | | | |
|---|---|---|---|---|---|---|---|
| | 20° C. | 30° C. | 40° C. | 50° C. | 60° C. | 70° C. | 80° C. |
| pH → IO → AT | 246 | 272 | 242 | 164 | 98 | 44 | 8 |
| IO → pH → AT | 245 | 277 | 248 | 164 | n/a | n/a | n/a |
| pH → AT → IO | 258 | 270 | 230 | 150 | 94 | 45 | 8 |

While the preferred base fluid is a brine solution containing 3% potassium chloride, the possibility exists to decrease or increase the salt concentration if so desired. Table 6 shows the temperature dependent viscosities at a shear rate of 100 s$^{-1}$ for fluids prepared with different amounts of potassium chloride. It will be appreciated by those skilled in the art that other monovalent and divalent salts, such as ammonium chloride or calcium chloride, may also be suitable. The obtained values show that the fluid can be applied across a broad range of salinity that allows the use of base fluids with higher brine contents.

TABLE 6

| KCl [%] | Viscosities [cP] at 100 s$^{-1}$ | | | | | | | |
|---|---|---|---|---|---|---|---|---|
| | 20° C. | 30° C. | 40° C. | 50° C. | 60° C. | 70° C. | 80° C. | 90° C. |
| 2 | 34 | 360 | 326 | 200 | 129 | 100 | 36 | 2 |
| 3 | 304 | 404 | 300 | 150 | 133 | 88 | 57 | 17 |
| 4 | 424 | 384 | 297 | 112 | 47 | 13 | — | — |
| 5 | 388 | 294 | 74 | 56 | 10 | — | — | — | b) pH Dependence

Table 7 provides examples for the performance of fluids prepared using different acidic compounds for the adjustment of the pH. The pH of the fluid was measured with a Horiba™ pH meter.

TABLE 7

| acid | Viscosities [cP] at 100 s$^{-1}$ | | | | | | | |
|---|---|---|---|---|---|---|---|---|
| | 20° C. | 30° C. | 40° C. | 50° C. | 60° C. | 70° C. | 80° C. | 90° C. |
| HCl (15% aq.) | 160 | 373 | 340 | 195 | 71 | 70 | 52 | 16 |
| AcOH (60% aq.) | 250 | 390 | 350 | 200 | 137 | 112 | 70 | 25 |

It is further possible to add the buffer (acid or base) required for the adjustment of the pH at different stages of the gelation process. It is possible to premix or partially premix the buffer with the anionic surfactant (IO), and thus change the pH of that particular component without significantly affecting the gelation process or the quality of the resulting gel, as shown by the results in Table 8.

TABLE 8

| addition to | Viscosities [cP] at 100 s$^{-1}$ | | | |
|---|---|---|---|---|
| | 20° C. | 30° C. | 40° C. | 50° C. |
| fluid | 243 | 278 | 257 | 182 |
| IO | 241 | 160 | 158 | 70 |
| IO, fluid (50% each) | 280 | 263 | 202 | 77 |

While operationally more involved, the individual addition of buffer via a separate pump offers a higher degree of flexibility and allows for immediate changes in loading/concentration if desired.

The pH and the amount of acid/base used significantly influences the gel properties and the speed of the gelation process. To explore the performance of the fluid at different pH, temperature dependent rheology was investigated for various amounts of acid added to the mixture. The fluid tolerates a deviation in pH and is thus applicable over a greater range (Table 9). The variation of pH allows optimization of the fluid properties towards the application at a certain temperature range. In one embodiment, the optimum pH for an application of higher temperatures is 4.3-4.5.

TABLE 9

| AcOH [%] | Viscosities [cP] at 100 s$^{-1}$ | | | | | | | |
|---|---|---|---|---|---|---|---|---|
| | 20° C. | 30° C. | 40° C. | 50° C. | 60° C. | 70° C. | 80° C. | 90° C. |
| 0.05 | 10 | 14 | 45 | 50 | 33 | 12 | 3 | — |
| 0.15 | 18 | 266 | 306 | 226 | 145 | 82 | 27 | — |
| 0.30 | 250 | 390 | 350 | 200 | 137 | 112 | 70 | 25 |
| 0.45 | 202 | 405 | 315 | 127 | 87 | 83 | 50 | 6 |
| 0.67 | 304 | 404 | 300 | 150 | 133 | 88 | 57 | 17 |
| 0.90 | 336 | 400 | 308 | 109 | 73 | 63 | 27 | — |

Further investigations with respect to the method of preparation included the variation of mixing speeds. Gels were mixed under three different speeds, which indicates the effect of different pump rates on the gel performance. The results indicate that the fluid is applicable under various conditions, allowing for flexibility with respect to the shear arising during the blending and pumping processes (Table 10).

TABLE 10

| rpm | Viscosities [cP] at 100 s$^{-1}$ | | | | | | | |
|---|---|---|---|---|---|---|---|---|
| | 20° C. | 30° C. | 40° C. | 50° C. | 60° C. | 70° C. | 80° C. | 90° C. |
| 500 | 255 | 385 | 286 | 130 | 75 | 70 | 34 | — |
| 1000 | 304 | 404 | 300 | 150 | 133 | 88 | 57 | 17 |
| 2000 | 157 | 322 | 208 | 82 | 65 | 62 | 38 | 4 | c) Thickener-Surfactant Ratio

In one embodiment, the polymer-to-anionic surfactant ratio is 1:9, with a total of 0.2 w % active material within the fluid. The influence of the amount of polymer associative thickener on the performance of the fluid was investigated by increasing the active amount of the associative thickener in the fluid, while maintaining the amount of the anionic surfactant constant. The speed of the gelation process was enhanced by increasing in the amount of associative thickener. The performance of the resulting fluids with respect to their rheological properties varies upon changes to the ratio surfactant—thickener and an optimum value can be defined depending on the desired applicable temperature range. The results (Table 11) show that the system is robust and tolerates deviation from preferred ratios.

| w % AT | w % IO | Viscosities [cP] at 100 s$^{-1}$ | | | | | | | |
|---|---|---|---|---|---|---|---|---|---|
| | | 20° C. | 30° C. | 40° C. | 50° C. | 60° C. | 70° C. | 80° C. | 90° C. |
| 0.2 | 1.8 | 304 | 404 | 300 | 150 | 133 | 88 | 57 | 17 |
| 0.3 | 1.8 | 426 | 461 | 410 | 230 | 90 | 65 | 28 | — |
| 0.4 | 1.8 | 518 | 475 | 394 | 110 | 109 | 62 | — | — | d) Mixtures of Anionic Surfactant Components

The alkyl-residue of the anionic surfactant may vary in length and saturation. Depending on the choice of the surfactant component, the available temperature range of the fluid can be attenuated. Generally, anionic surfactants with a lower polarity provide an enhanced high temperature performance.

Alternatively, it is possible to further increase the applicable temperature range of the system without altering the performance of the gel at lower temperatures by applying mixtures of different mono-alkyl phosphate esters. Tests were conducted with surfactants differing in the number of ethoxylate units. The main focus was the influence on the gelation time, which is assumed to increase, and likewise on the gel quality at low temperatures. Surfactants differing in their hydrophilicity were mixed and homogenized prior to their addition to the fluid. Homogenisation was achieved by applying heat to the solution either using an external heat source or microwaves. The solutions were cooled to room temperature prior to use. Table 12 summarizes examples of the effect of varying the ratio of a mixture of more (NI(+)) and less (NI(-)) hydrophilic anionic surfactants on the rheological properties of the resulting fluids.

TABLE 12

| | Viscosities [cP] at 100 s$^{-1}$ | | | | | | | |
|---|---|---|---|---|---|---|---|---|
| NI(+)/NI(-) | 20° C. | 30° C. | 40° C. | 50° C. | 60° C. | 70° C. | 80° C. | 90° C. |
| 1/0 | 250 | 390 | 350 | 200 | 137 | 112 | 70 | 25 |
| 5/1 | 65 | 338 | 262 | 125 | 84 | 77 | 48 | 10 |
| 4/1 | 150 | 285 | 264 | 155 | 97 | 79 | 47 | 16 |
| 3/1 | — | 268 | 277 | 172 | 110 | 85 | 53 | 20 |
| 2/1 | — | 290 | 295 | 180 | 115 | 90 | 61 | 18 |

Table 13 shows the values obtained when investigating the influence of increasing the amount of associative thickener in the fluid that was obtained using a 5:1 ratio of more (NI(+)) and less (NI(-)) hydrophilic anionic surfactants. It can be summarized that the loss in gel strength due to the decreased hydrophilicity can be compensated by altering the ratio of surfactant and thickener.

TABLE 13

| | Viscosities [cP] at 100 s$^{-1}$ | | | | | | | |
|---|---|---|---|---|---|---|---|---|
| w % AT | 20° C. | 30° C. | 40° C. | 50° C. | 60° C. | 70° C. | 80° C. | 90° C. |
| 0.2 | 65 | 338 | 262 | 125 | 84 | 77 | 48 | 10 |
| 0.4 | 354 | 358 | 341 | 298 | 180 | 135 | 39 | 1 | e) Surfactant—Thickener Premix

To study the influence of premixing the surfactant and thickener component, experiments were carried out with fluids prepared from associative thickener-surfactant premixed solutions that contained increasing amounts of anionic surfactant (IO). The total amount of anionic surfactant in each gel remained the same, and the remaining surfactant was added to the base fluid separately. The presence of anionic surfactant in the concentrated solution of the associative thickener can influence the gelation process due to the primed formation of the micellar network. The mixtures were prepared using an undiluted sample of the anionic surfactant to the thickener solution (which is a solution of AT and co-surfactant). A homogeneous mixture was achieved by agitation and the application of an external heat source. The amount of surfactant that can be premixed with the thickener is limited due to the increasing strength of the network and thus increasing viscosity of the concentrate. The percentage reflects the amount of surfactant premixed with thickener with respect to the total amount of surfactant added to the gel. Premixing 13% of the total amount of surfactant with the thickener compound yielded the best overall performance when investigating the viscosities of the fluids at temperatures between 20 and 50° C. (Table 14).

TABLE 14

| | Viscosities [cP] at 100 s$^{-1}$ | | | |
|---|---|---|---|---|
| w % IO | 20° C. | 30° C. | 40° C. | 50° C. |
| 3 | 252 | 254 | 204 | 148 |
| 13 | 242 | 277 | 257 | 182 |
| 26 | 297 | 317 | 277 | 145 |
| 40 | 134 | 181 | 171 | 140 |
| 50 | 336 | 338 | 285 | 101 | f) Surfactant Formulations in a Number of Media

Preferably, the anionic surfactant compound is soluble in water at a pH higher than 3. In order to increase the concentration of active material in solution, alternative solvents and solvent mixtures can be applied. The concentration of the surfactant solution and the solvents used influence the gel strength and thus the performance of the fluid as fracturing treatment fluid. Consequently, gelation times and gel properties of various fluids were investigated upon addition of surfactant solutions in various solvents. Non-limiting examples of suitable solvents include iso-propanol, 1,2-propandiol, ethanol, and aqueous mixtures of thereof. Table 15 provides an example for the application of different iso-propanol (iPrOH)/water mixtures as solvents for the surfactant component and the strengths of the resulting fluids.

TABLE 15

| | Viscosities [cP] at 100 s$^{-1}$ | | | |
|---|---|---|---|---|
| H$_2$O/iPrOH | 20° C. | 30° C. | 40° C. | 50° C. |
| 1/0 | 297 | 317 | 277 | 145 |
| 2/1 | 112 | 150 | 121 | 139 |
| 1/1 | 205 | 215 | 156 | 74 |
| 1/2 | 289 | 281 | 195 | 101 |
| 2/7 | 271 | 197 | 94 | 31 |

The increase in the amount of iso-propanol in the fluid influenced the fluid properties, especially at elevated temperatures. A similar effect can be achieved by increasing the concentration of active material in solution, which leads to a decrease of additional solvent in the fluid. Table 16 summarizes experiments carried out to compare the performance of gels prepared with iso-propanol/water (1/1) solutions containing 25% and 50% active material applying three different samples of premixed surfactant-thickener packages. The term w % (IO) refers to the weight % of anionic surfactant contained in the surfactant-thickener pre-mix and the term w % (sol) refers to the concentration of the anionic surfactant formulation. It can be concluded that the application of 50% solution leads to an enhanced gel performance with respect to higher temperatures. The best overall performance is achieved for a gel prepared with 13% of the total amount of surfactant being premixed with the thickener.

TABLE 16

| | | Viscosities [cP] at 100 s$^{-1}$ | | | |
|---|---|---|---|---|---|
| w % (IO) | w % (sol) | 20° C. | 30° C. | 40° C. | 50° C. |
| 26 | 25 | 205 | 215 | 156 | 74 |
| 26 | 50 | 201 | 237 | 215 | 137 |
| 13 | 25 | 323 | 300 | 179 | 120 |
| 13 | 50 | 245 | 277 | 248 | 164 |
| 3 | 25 | 297* | 291 | 207 | 104 |
| 3 | 50 | 181* | 215 | 192 | 120 |

*delayed gelation (20 minutes)

g) Variation of Loadings

Figure 3:
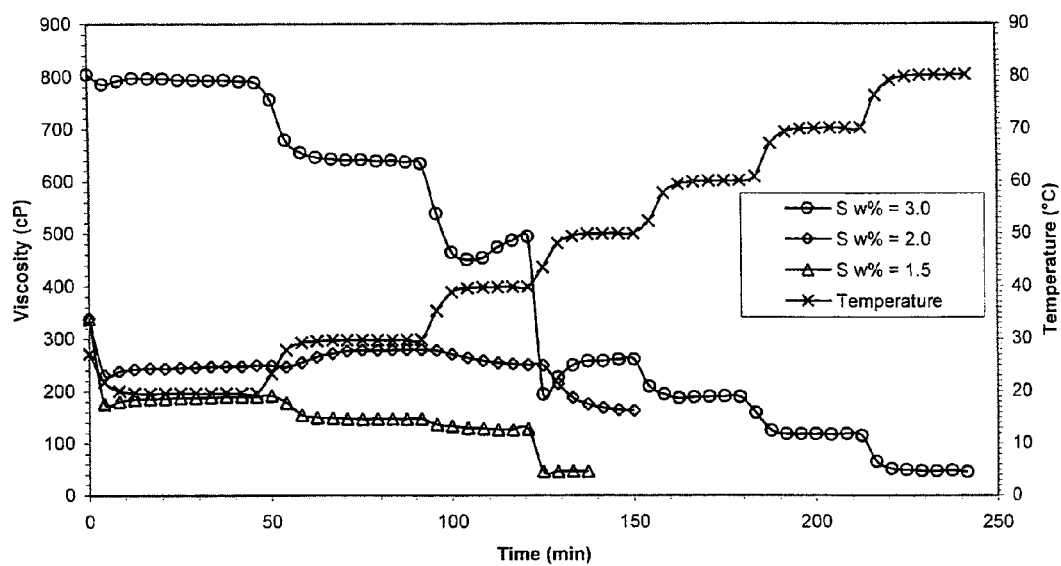
FIG. 3 is a graph showing the viscosity over time at 20-80° C. for gels prepared with different loadings of associative thickener and surfactant.

In order to be applicable as fracturing fluid, a viable system requires a certain degree of control over the viscosity obtained at given temperature. This is commonly achieved by the variation of the gellant loading, which equals the total amount of active material in the fluid. Several experiments were carried out to investigate the effect of the change in loadings on the gel performance at different temperatures. The loadings are given in weight percent based on the sum of active material of surfactant and associative thickener. A graphical representation of the data shown in Table 17 can be found in FIG. 3. An increase in loadings yielded significantly higher viscosities and sufficient gel strength at temperatures as high as 80° C. The reduction of the loadings showed the desired decrease in viscosity, enabling a more cost efficient system when applied in low temperature wells.

TABLE 17

| | | | Viscosities [cP] at 100 s$^{-1}$ | | | | | | |
|---|---|---|---|---|---|---|---|---|---|
| Σ w % | w % (IO) | w % (AT) | 20° C. | 30° C. | 40° C. | 50° C. | 60° C. | 70° C. | 80° C. |
| 3.0 | 2.70 | 0.30 | 793 | 638 | 468 | 260 | 189 | 117 | 47 |
| 2.0 | 1.80 | 0.20 | 245 | 277 | 248 | 164 | n/a | n/a | n/a |
| 1.5 | 1.35 | 0.15 | 190 | 147 | 128 | 47 | n/a | n/a | n/a |

Figure 4:
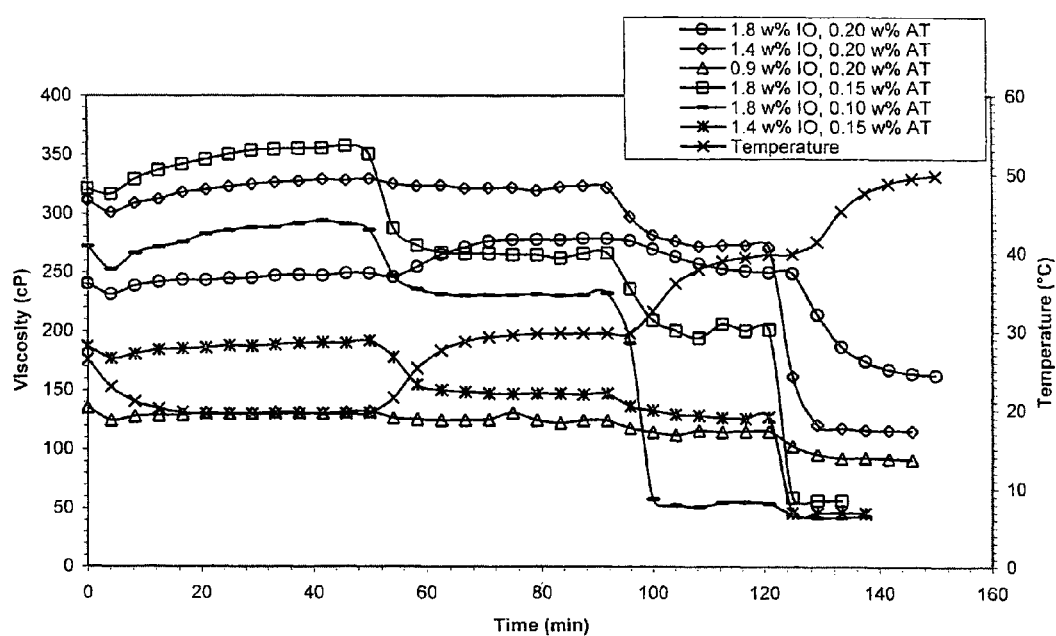
FIG. 4 is a graph showing the viscosity over time at 20-50° C. for different associative thickener and surfactant loadings.

Further experiments were conducted to investigate the possibility to further optimize the gel properties by independent variation of the two components (Table 18). A viable gel was still achieved for various combinations of loadings. This experiment indicates the high degree of flexibility that is available using the system. FIG. 4 provides a graphical summary of the findings with respect to the potential decrease in loading to enable a more economic approach for field applications especially when performed at low temperatures.

TABLE 18

| | | Viscosities [cP] at 100 s$^{-1}$ | | | |
|---|---|---|---|---|---|
| w % (IO) | w % (AT) | 20° C. | 30° C. | 40° C. | 50° C. |
| 1.8 | 0.20 | 245 | 277 | 248 | 164 |
| 1.4 | 0.20 | 325 | 325 | 271 | 117 |
| 0.9 | 0.20 | 130 | 125 | 115 | 92 |
| 1.8 | 0.15 | 356 | 265 | 201 | 56 |
| 1.8 | 0.10 | 225 | 190 | 39 | 28 |
| 1.4 | 0.10 | 156 | 118 | 45 | 24 | h) Application as Energized Fluid

Figure 5:
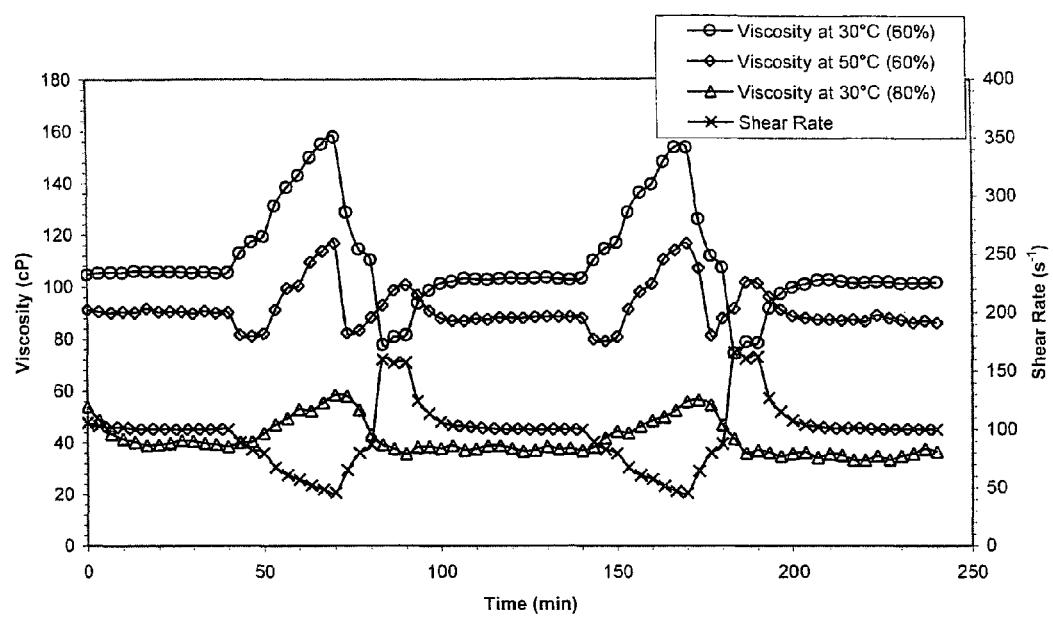
FIG. 5 is a graph showing the apparent viscosity at different shear rates for energized fluids that differ in foam quality. Data is presented for measurements at 30 and 50° C.

Flow loop experiments were conducted using a fluid which was prepared with 1.8 w % anionic surfactant and 0.2 w % associative thickener in a 3% KCl solution at pH 4.5. Compressed nitrogen was used in order to energize the fluid, creating a foam of 60% or 80% quality respectively. The rheological performance of the foams was investigated under different shear rates and various temperatures. In addition, the homogeneity of the fluid was observed in a transparent section of the loop. A stable and homogeneous foam was generated without addition of a foaming agent. It will be appreciated by those skilled in the art that a foaming agent additive could be added if desired. The results show that the system is suitable to be applied as energized fluid (Table 19, FIG. 5).

TABLE 19

| | | Viscosities [cP] | | | |
|---|---|---|---|---|---|
| Foam Quality [%] | T [° C.] | 100 s$^{-1}$ | 75 s$^{-1}$ | 57 s$^{-1}$ | 45 s$^{-1}$ |
| 60 | 30 | 105 | 119 | 144 | 159 |
| 60 | 50 | 90 | 81 | 100 | 116 |
| 80 | 30 | 40 | 45 | 55 | 60 | i) Stability Under Field Conditions

A viable fracturing fluid system has to be applicable using different grades of water that may differ in quality. To confirm the applicability of the system, the gel performance of fluids prepared with water from different sources was investigated. The gels were prepared using 1.8 w % anionic surfactant and 0.2 w % associative thickener. Apart from the "field water" sample that was premixed with 3% KCl, brine was added prior to the gellant components. In all three cases, the same amount of buffer was required in order to adjust the pH to 4.3-4.5. The results confirm that the system is applicable under conditions present in field operations (Table 20). Tap water is Calgary tap water, DI is deionised Calgary tap water, and field water may be highly variable depending on its source and method of transport.

TABLE 20

| water source | Viscosities [cP] at 100 s$^{-1}$ | | | |
|---|---|---|---|---|
| | 20° C. | 30° C. | 40° C. | 50° C. |
| DI water | 245 | 277 | 248 | 164 |
| tap water | 407 | 379 | 274 | 103 |
| field water | 410 | 380 | 267 | 90 |

Further experiments towards the application under field conditions comprise the use of quaternary amine based supplemental clay control agents which have to be compatible with the system when applied in concentrations required for the successful treatment of formation clays. As an example an additive based on a solution of alkoxylated quaternary amines was tested (Table 21).

TABLE 21

| w % additive | Viscosities [cP] at 100 s$^{-1}$ | | | |
|---|---|---|---|---|
| | 20° C. | 30° C. | 40° C. | 50° C. |
| 0 | 410 | 380 | 267 | 90 |
| 0.3 | 463 | 430 | 294 | 96 |

Example 3

Breaking the System

Figure 6:
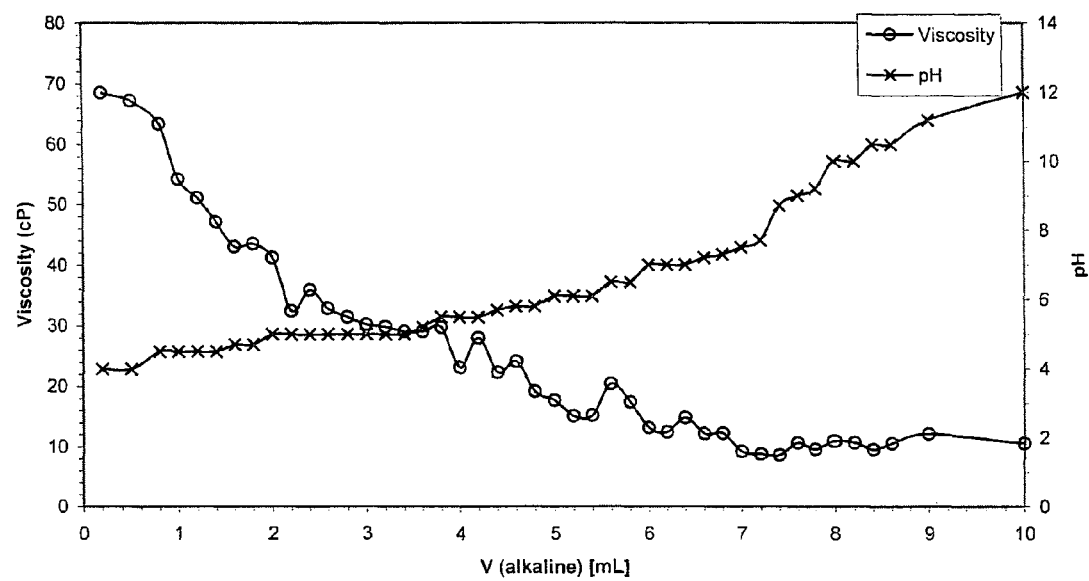
FIG. 6 is a graph showing the viscosity and pH of a gel in dependence on the amount of alkaline added.

In order to determine the critical pH value at which the gel network is destroyed, the pH of a gel was increased by stepwise addition of a liquid alkali. The investigated gel was prepared using 1.8 w % anionic surfactant and 0.2 w % of the associative thickener compound. The pH of the solution in 3% KCl water was adjusted to a pH of 4.3 prior to the addition of the alkaline. Experimental tests with a 5% solution of sodium hydroxide in water-methanol reveal that the integrity of the network was disrupted at a pH>8 as shown in FIG. 6.

Unless otherwise stated the following tests were carried out with a gel prepared with 2 w % active material (1.8 w % surfactant and 0.2 w % associative thickener) in an aqueous solution containing 3% KCl with the pH being adjusted to 4.3 by addition of an aqueous solution of AcOH. The gels were mixed at a speed of 1000 rpm using an overhead stirrer with an impeller blade. In order to achieve a homogeneous mixture the gels are stirred for two minutes prior to the measurements. The breaker additives were mixed directly into the gel solutions. The 'break time' is defined as the time after which the viscosity of the fluid sheared at 100 s$^{-1}$ is lower than 10 cP.

Table 22 summarizes the results obtained using a powdered form of light burnt magnesium oxide (MgO) material (bulk density—22 lb/ft$^3$, particle size—3-8 µm, surface area—20-30 m/g).

TABLE 22

| w % MgO | Break time at 25° C. [min] |
|---|---|
| 0.05 | 28 |
| 0.10 | 25 |
| 0.20 | 8 |
| 0.30 | 7 |
| 0.60 | 5.5 |

The experiments were carried out at 25° C. Similar experiments carried out at elevated temperatures (50° C.) revealed a reduction in the duration of the break and a loss in control over the respective time.

Figure 7:
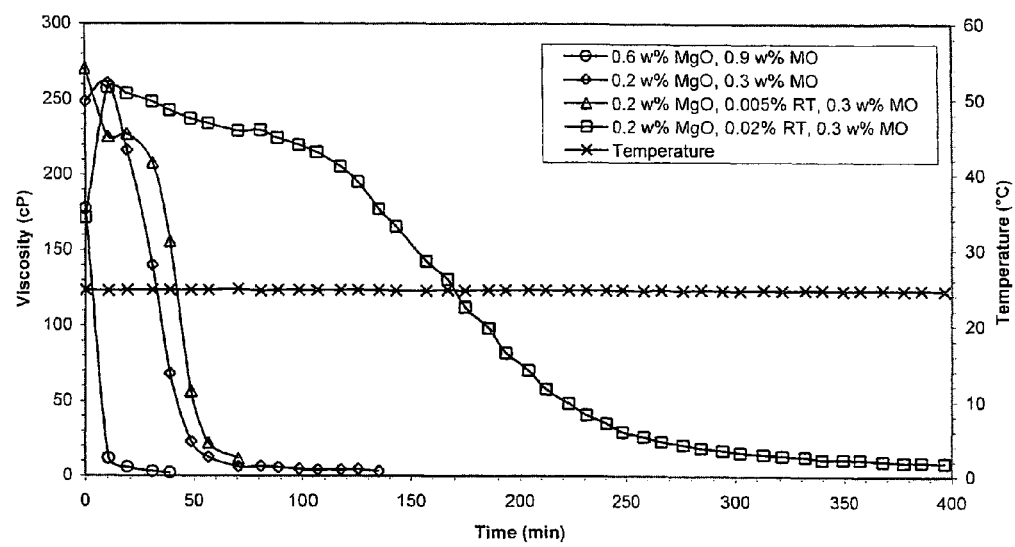
FIG. 7 is a graph showing the break profiles for a gel at 25° C. for different compositions of light burnt MgO—emulsified in mineral oil with or without a retarding additive.

The retarding effects due to the application of MgO as slurry in mineral oil (MO) was investigated using a 40 w % suspension. A homogeneous mixture was obtained by agitation. Further investigations were carried out with suspensions that also contained retarding additives. Those additives could comprise fatty acids or fatty alcohols as well as alkaline sulfonate salts. Table 23 offers a comparison of the duration of the break observed in dependence on the formulation in which the light burnt magnesium oxide is applied. Graphical break profiles are provided for several examples in FIG. 7.

TABLE 23

| w % MgO | w % RT | w % mineral oil | Break time at 25° C. [min] |
|---|---|---|---|
| 0.20 | | | 8 |
| 0.20 | | 0.30 | 62 |
| 0.20 | 0.0005 | 0.30 | 68 |
| 0.20 | 0.0020 | 0.30 | 380 |
| 0.28 | 0.0005 | 0.42 | 45 |
| 0.32 | 0.0005 | 0.48 | 28 |
| 0.36 | 0.0005 | 0.54 | 17 |
| 0.60 | | | 5.5 |
| 0.60 | | 0.90 | 13 |

Separate tests have shown that the effect of pure mineral oil itself (without MgO) is negligible in the applied quantities. At elevated temperatures the addition of pure mineral oil will lead to a disruption of the network if applied in considerable quantities. Those however greatly exceed the amount used in conjunction with the magnesium oxide suspensions.

TABLE 24

| w % MO | Break time at 50° C. [min] |
|---|---|
| 0.6 | 170 |
| 0.8 | 91 |
| 1.5 | 70 |
| 2.5 | 58 |
| 3.0 | 50 |

In general a decrease in break time is observed when investigating break times at elevated temperatures. Break times at elevated temperatures are commonly observed by immersing the fracturing fluid in a water or oil bath at the desired temperature immediately after addition of the breaker material. However, temperature studies in the field have shown that the increase in temperature of the fluid is delayed for several minutes due to the high rate with which the fluid is pumped down the wellbore. A comparative study revealed a considerable increase in the duration of the break upon delay of the temperature increase.

TABLE 25

| w % MgO | w % RT | w % mineral oil | Time to T = 50° C. [s] | Break time at 50° C. [min] |
|---|---|---|---|---|
| 0.48 | 0.0005 | 0.72 | 480 | 10 |
| 0.48 | 0.0005 | 0.72 | 1080 | 56 |

Further tests were carried out using a hard burnt species of magnesium oxide (bulk density>70 lb/ft$^3$, particle size~10 µm). Due to its production process, this material is less reactive. The bigger particle size and reduced surface area of the hard burnt material result in a decrease in reactivity. Table 26 provides examples for break times obtained with hard burnt MgO at 25° C. The degradation of the viscosifying network is considerably slower. Similar to experiments with the more reactive species, the formulation of MgO as a suspension in mineral oil leads to further increase in the time required for completion of the reaction.

TABLE 26

| w % MgO | w % Mineral Oil | Break time at 25° C. [min] |
|---|---|---|
| 0.3 | | 355 |
| 0.5 | | 270 |
| 0.4 | 0.6 | 570 |
| 1.2 | 1.8 | 340 |

While the increase in temperature is accompanied with a loss of controllability of break time for the light burnt species, the lower reactivity of the hard burnt material enables sufficient control over the reaction. Table 27 summarised the results obtained for powdered samples as well as emulsified material at 50° C., while table 28 provides the data obtained at 70° C.

TABLE 27

| w % MgO | w % Mineral Oil | Break time at 50° C. [min] |
|---|---|---|
| 0.2 | | 160 |
| 0.3 | 0.2 | 260 |
| 0.4 | | 78 |
| 0.6 | 0.4 | 180 |
| 0.6 | 0.9 | 120 |
| 0.6 | | 68 |
| 0.7 | | 45 |
| 0.8 | | 43 |
| 0.9 | 0.6 | 160 |
| 1.0 | | 22 |

TABLE 28

| w % MgO | Break time at 70° C. [min] |
|---|---|
| 0.02 | >300 |
| 0.04 | 76 |
| 0.10 | 27 |
| 0.40 | 10 |

The results show that it is possible to break the gel both at high and low temperatures.

Surfactant-Based Breaker

Unless otherwise stated tests are carried out with a gel prepared with 2 w % active material (1.8 w % anionic surfactant and 0.2 w % associative thickener) in an aqueous solution containing 3% KCl with the pH being adjusted to 4.3 by addition of an aqueous solution of AcOH. The gels are mixed at speed of 1000 rpm using an overhead stirrer with an impeller blade. In order to achieve a homogeneous mixture the gels are stirred for two minutes prior to the measurements. The breaker additives are mixed directly into the gel solutions. The 'break time' is defined as the time after which the viscosity of the fluid sheared at 100 s$^{-1}$ is lower than 10 cP.

Table 29 shows the results obtained when measuring the duration of the break of the network applying different loadings of a neat alkylpolyethylene glycol ether (APG) to the fracturing fluid.

TABLE 29

| w % APG | Break time at 25° C. [min] |
|---|---|
| 0.05 | >300 |
| 0.10 | 150 |
| 0.20 | 80 |
| 0.25 | 45 |
| 0.30 | 21 |
| 0.35 | 17 |
| 0.40 | 15 |

The effective break time can be triggered either by variation of the concentration of the breaker additive as shown above or the composition of the alkylpolyethylene glycol ethers. Table 30 shows values obtained investigating two different species that differ in the degree of ethoxylation.

TABLE 30

| w % APG | (EO)x | Break time at 25° C. [min] |
|---|---|---|
| 0.2 | 50 | 80 |
| 0.2 | 80 | 103 |
| 0.3 | 50 | 17 |
| 0.3 | 80 | 27 |

The surfactant breaker may be formulated in a variety of different manners. An encapsulated form of the surfactant breaker (10 w % active in an inert matrix) can be applied as is shown in Table 31.

TABLE 31

| w % APG | encap | Break time at 25° C. [min] |
|---|---|---|
| 0.20 | | 80 |
| 0.25 | | 45 |
| 0.30 | | 17 |
| 0.20 | x | 150 |
| 0.25 | x | 35 |
| 0.30 | x | 25 |

The comparative data shows that the encapsulation affect the duration of the break, delaying the release of the active material. Similar studies at elevated temperatures confirm the applicability of the material as well as the effectiveness.

TABLE 32

| w % APG | encap | Break time at 50° C. [min] |
|---|---|---|
| 0.20 | | 100 |
| 0.25 | | 8 |
| 0.30 | | 6 |
| 0.20 | x | 180 |
| 0.25 | x | 38 |
| 0.30 | x | 20 |

Example 4

Regain Permeability Testing

The term "regain permeability" refers to the degree to which a permeability of a formation that has been treated with a fracturing fluid differs from the original permeability of the subterranean formation. An ideal completion fluid, from a regain permeability perspective, has a regain permeability at low drawdown pressure (1-2% of maximum) which matches that of the original undamaged baseline measurements, indicating no permanent damage has been caused. Due to the water-solubility of all components, the use of an embodiment of the fracturing fluid described herein may result in improved clean-up properties and reduced loss of the components into the formation or the sand pack.

The objective of the fluid evaluation or leak off test described in this example is to provide an evaluation of the total effect of the completion fluid system on the formation. In this experiment, a regain permeability apparatus was equipped with a core sample from the Bakken formation and placed in an oven that was set to the formation temperature of 69° C. The sample was rich in carbonates and its dimensions were length—5.70 cm, diameter—3.77 cm and pore volume—6.11 cm$^3$. As is typical of the Bakken formation, the permeability was very low, 0.04 millidarcies air permeability, much lower than average oil reservoirs. In this case, regain permeability to oil was being measured and therefore, in order to ensure representative test conditions, the core was brought to its original state by reconditioning it in oil from the respective formation for a period of six weeks prior to the experiment.

The testing parameters were chosen as follows: fracture pressure—23240 kPa, pore pressure—11000 kPa, net overburden pressure—16158 kPa. The baseline permeability as well as the regain permeability measurements were taken in the forward direction, whereas the fracturing fluid was circulated in the reverse direction. The composition of the fracturing fluid was based on a target viscosity of 150-200 cP (at 100 s−1) and a reduction of the viscosity to <15 cP (at 100 s−1) within four hours.

The gel was prepared similar to the manner described in Example 2. 2.1 w % of the anionic surfactant and a premixed solution of 0.3 w % of the anionic surfactant and 0.3 w % of the associative thickener (AT) were added subsequently to an aqueous solution containing 5.25% potassium chloride. In addition, a suspension of 0.15 w % magnesium oxide and 0.15 w % mineral oil were added.

After a leakoff exposure time of 30 minutes a total volume of 0.99 mL and a linear penetration depth of 0.84 cm was recorded. Table 33 shows the permeabilities measured for specific pressures applied to the core. The regain permeability represents the percentage of permeability recovered with respect to the baseline permeability of 0.009 mD.

TABLE 33

| Pressure (kPa) | Permeability (mD) | Regain Permeability (mD) | Regain Permeability (%) |
|---|---|---|---|
| 690 | 0.009 | 0.0020 | 2.5 |
| 1379 | 0.010 | 0.0030 | 3.3 |
| 2758 | 0.009 | 0.0050 | 6.3 |
| 5516 | 0.009 | 0.0020 | 21.8 |
| 8274 | 0.009 | 0.0050 | 59.2 |
| 11032 | 0.010 | 0.0070 | 69.1 |

While the regained permeability does not match the baseline permeability, the recovery of 69.1% of the permeability is considered a high yield when evaluating a fluid under stringent test conditions (tight carbonate formation at high temperatures) present in the described experiment. Compared to values generally expected for guar-based fluids, the value indicates that the amount of damage that this fluid caused to the formation would be low.

Example 5

Field Test Conditions

In order to demonstrate the viability of the described fluid system, field tests were performed on two shallow gas wells in Northern Alberta. The wells had an average depth of 575 m with the perforations located in the Colorado formation from 471 to 475 m and 458 to 461 m for one well and from 497 to 499 m and 490.5 to 494.5 m for the second one. Bottom hole temperature, pressure and fracture gradient are estimated to be 20° C., 4100 kPa and 20.5 kPa/m, respectively.

Based on the treatment specifications, the composition of the fluid was programmed to 0.88 w % of anionic surfactant and 0.18 w % associative thickener, with 2-ethylhexanol as a co-surfactant (AT:co-surfactant=90.9 to 9.1). The fluids were applied separately with the thickener being partially premixed with 20% of the total amount of active surfactant. A 50 w % suspension of magnesium oxide in mineral oil, which contained further additives to ensure homogeneity, was also added. The initial concentration of the magnesium oxide suspension was set to 0.05 w % and was continuously increased to a final amount 0.1 w % at the end of the treatment.

The base fluid—a 5.5% solution of potassium chloride in water—was supplied in bulk trucks. The potassium chloride solution had a slightly red colour which indicated somewhat higher iron content compared to tap water.

To limit the amount of water in contact with the formation, the fluid was applied as energized system. The aqueous fluid was foamed with nitrogen with the initial foam quality being set to 80% and the clean fluid-gas ratio being subsequently decreased to 3:5 (60% foam quality) on the last proppant stage. The wellbores were flushed with 100% nitrogen. The foamed fluid was pumped into the formation at a programmed rate of 5.5 m$^3$/min down 114.3 mm casing. The total treatment volumes indicated that 20.7 m$^3$ and 19.4 m$^3$ of fluid were pumped into the formations.

Following an initial pad without proppant, 20/40 mesh Ottawa sand was blended into the low pressure liquid, which was pumped to a horsepower unit. The horsepower then pumped the fluid on the high pressure side which combined with nitrogen and was pumped down hole. The proppant concentration was continuously step-ramped up during the subsequent stages, resulting in an average amount of 20 tonnes of proppant pumped into formation per well.

Figure 8:
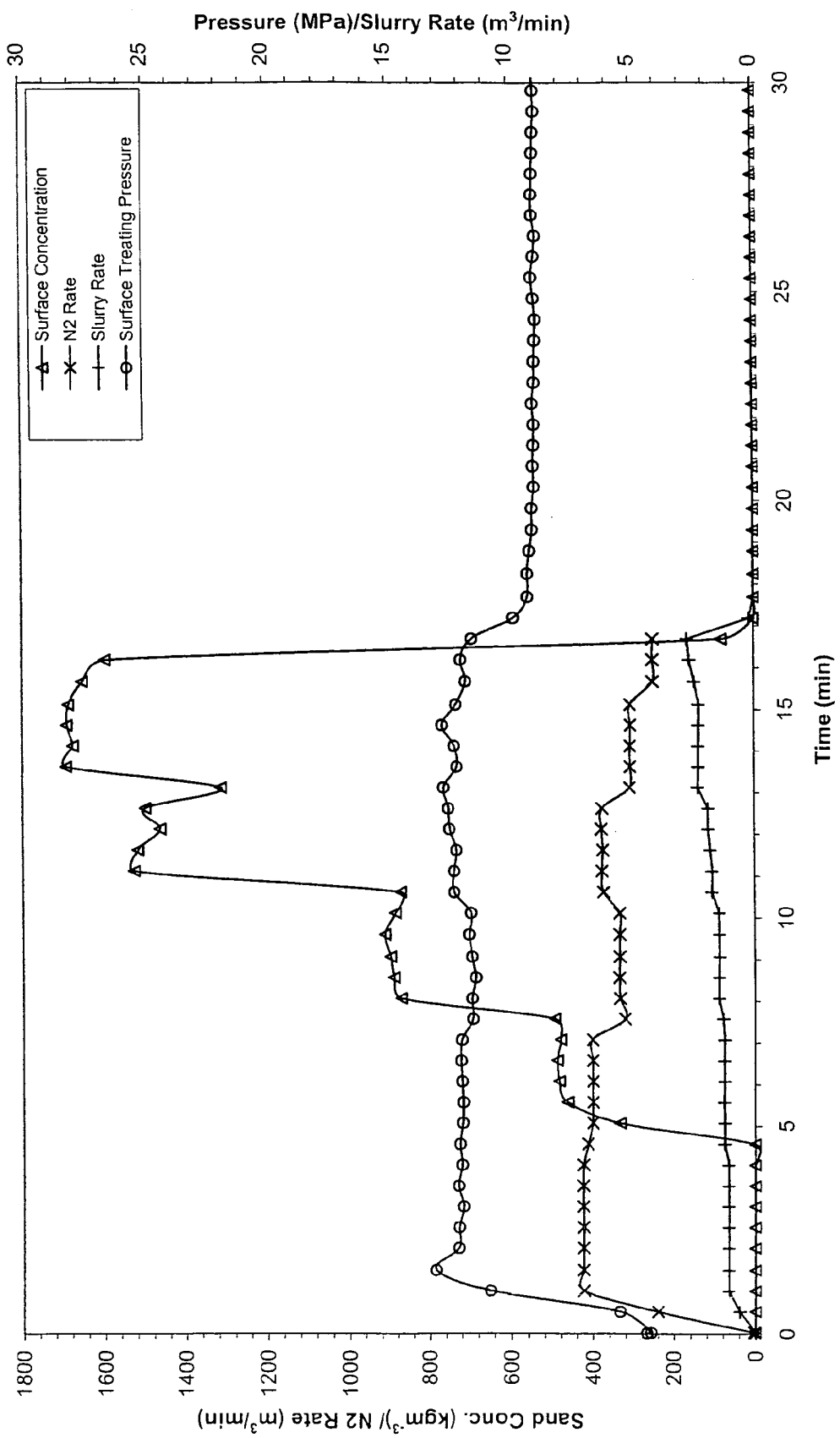
FIG. 8 represents the data obtained for a field trial described in Example 5 below. The pressures and sand concentrations on surface and down hole for the period of the treatment are shown.

FIG. 8 shows a treatment report for one of the two wells. It shows the surface treatment pressure, as well as the sand concentration on the surface. The data obtained during the treatment indicated that the amount of proppant placed in the formation matched the volume of the created fracture and thus confirms the success of the treatment.

In addition, it was reported that the fluid system to be easy to pump compared to an alternative surfactant based fluid. The reduced amount of pump cavitations suggested that the described system, comparatively, provided a more homogenous foam without sections of separated nitrogen and liquid.

FIG. 8 represents the data obtained for the field test described in Example 5. The pressures and sand concentrations on surface and down hole for the period of the treatment are provided.

REFERENCES

All publications mentioned herein are indicative of the level of skill in the art of this invention and are herein incorporated by reference, where permitted, to the same extent as if each publication was specifically and individually indicated to be incorporated by reference.

CA2380311 A1—Fluids containing Viscoelastic Surfactants and Methods of Using the Same
CA2485777 A1—Method for Controlling the Fluid Loss Properties of Viscoelastic Surfactant Based Fluids
CA2488260 A1—Anionic Viscoelastic Surfactant
CA2574003 A1—Foamed Viscoelastic Surfactants
EP0993334 B1—Fluids Containing Viscoelastic Surfactants and Methods of Using the Same
GB2398310—A Viscoelastic Fracturing Fluid
GB2432177—A Well treatment using a fatty acid ester
U.S. Pat. No. 4,180,491 A1—Non-ionic Polyurethane thickener with Surfactant Cothickener and Organic Diluent, Clear Concentrates, Aqueous Print Pastes, Coloring Compositions, Methods of Making and Printing
U.S. Pat. No. 4,615,825—Friction Reduction Using a Viscoelastic Surfactant
U.S. Pat. No. 5,258,137—Viscoelastic Surfactant Based Foam Fluids
U.S. Pat. No. 6,035,936—Viscoelastic Surfactant Fracturing Fluids and a Method for Fracturing Subterranean Formations
U.S. Pat. No. 6,258,859 B1—Viscoelastic Surfactant Fluids and Related Methods of Use
U.S. Pat. No. 6,482,866 B1—Viscoelastic Surfactant Fluids and Related Methods of Use
U.S. Pat. No. 6,506,710 B1—Viscoelastic Surfactants and Compositions Containing Same
U.S. Pat. No. 6,908,888 B2—Viscosity Reduction of Viscoelastic Surfactant Based Fluids
U.S. Pat. No. 7,084,095 B2—Methods for Controlling the Rheological Properties of Viscoelastic Surfactants based Fluids
US2003236174 A1—Viscoelastic surfactant fluids stable at High Brine Concentration and Methods of Using Same
US2004063587 A1—Surfactant Polymer Compositions for Enhancing the Stability of Viscoelastic Surfactant Based Fluid
US2005107503 A1—Aqueous fracturing fluid
US20060046937 A1—Viscoelastic Fluids Containing Nanotubes for Oilfield Uses
US 2006025321 A1—Viscoelastic surfactant composition having improved Theological properties and method of using for treating subterranean formations
US2006254774 A1—Degradable surfactants and methods of use
US2007034378 A1—Methods for effecting controlled break in pH dependent foamed fracturing fluid
US2007060482 A1—Methods and compositions for controlling the viscosity of viscoelastic surfactant fluids
US2007087940 A1—Method of using viscoelastic vesicular fluids to enhance productivity of formations
US2007213232 A1—Viscoelastic Surfactant Gels With Reduced Salt Concentration
US2007238624 A1—Multicomponent viscoelastic surfactant fluid and method of using as a fracturing fluid
US2007281869 A—Thermoviscoelastic System Fluid and Well Treatment Method
WO9950529 A1—Surfactant Based Gelling Composition for Wellbore Service Fluids
WO2005059059 A1—Viscoelastic Acid
WO2005071038 A1—Additive for Viscoelastic Fluid
WO2006003637 A1—Degradable Additive For Viscoelastic Surfactant Based Fluid System
WO2006059257 A2—Viscoelastic Surfactant Rheology Modifier
WO2006064440 A1—Viscoelastic Surfactant Rheology Modification
WO2007066269 A2—Viscoelastic Surfactant Rheology Modification
WO2008/065172 A2—PH Regulated Thickener System
WO2008/065173 A2—Thickener Composition

The invention claimed is:

1. A method of fracturing a subterranean formation penetrated by a well bore, comprising the step of formulating a fracturing fluid comprising micelles networked by a polymer comprising at least one hydrophilic group and at least one hydrophobic component, wherein the micelles are formed by an anionic surfactant comprising a compound of formulae I.a to I.f or salts thereof, or mixtures thereof:

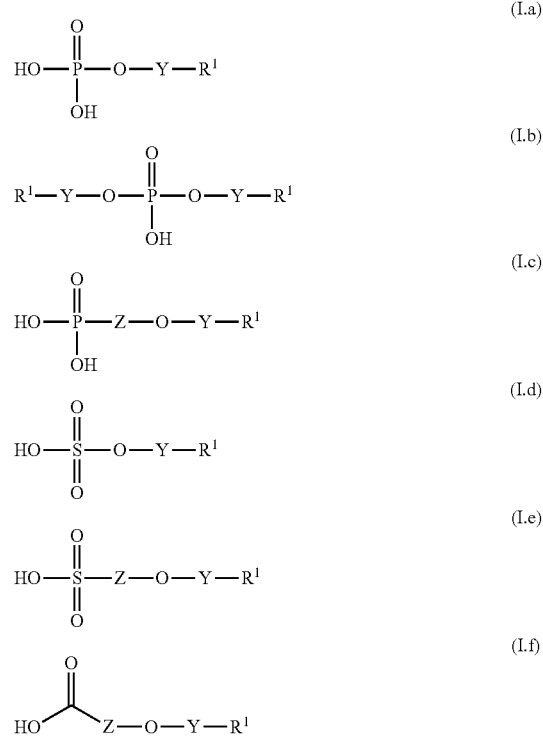

in which:
R$^1$ is selected from linear or branched C$_{16}$-C$_{22}$-alkyl, C$_{16}$-C$_{22}$-alkenyl, C$_{16}$-C$_{22}$-alkynyl, (C$_{15}$-C$_{21}$-alkyl)carbonyl, (C$_{15}$-C$_{21}$-alkenyl)carbonyl and (C$_{15}$-C$_{21}$-alkynyl)carbonyl,
Y is a group consisting of from 1 to 20 alkyleneoxy units and
Z is C$_1$-C$_4$-alkylene, pumping the fracturing fluid down the wellbore at a rate and pressure sufficient to initiate or extend a fracture in the formation and breaking the viscosity by adding a breaker, wherein the breaker is an alkaline material, an alkaline material precursor, or a non-ionic breaking surfactant.

2. The method of claim 1 wherein the fluid further comprises a non-ionic surfactant.

3. The method of claim 1 wherein the fluid further comprises a co-surfactant.

4. The method of claim 1 wherein the fluid has a pH less than about 5.

5. The method of claim 4 wherein the fluid has pH of about 4.3 to about 4.5.

6. The method of claim 1 wherein the fluid has a storage modulus (G') lower than the loss modulus (G") when measured at frequencies below 10 rad/sec.

7. The method of claim 1 wherein the polymer is added at a concentration less than the overlap concentration of the polymer.

8. The method of claim 1 wherein the fluid is foamed or energized.

9. The method of claim 1 wherein the fluid further comprises suspended proppants.

10. The method of claim 1 wherein the breaker comprises light burnt magnesium oxide or hard burnt magnesium oxide.

11. The method of claim 10 wherein the magnesium oxide is suspended in mineral oil.

12. The method of claim 11 further comprising a retarding agent.

13. The method of claim 12 wherein the retarding agent comprises a fatty acid, a fatty alcohols, or an alkaline sulfonate salt.

14. The method of claim 1 wherein the breaker is the non-ionic breaking surfactant.

15. The method of claim 14 wherein the non-ionic breaking surfactant comprises a non-ionic surfactant based on alkylpolyethylene glycol ethers, wherein the alkyl chain comprises a linear, saturated fatty alcohol with a chain length of $C_{12}$ to $C_{25}$.

16. The method of claim 15 wherein the degree of ethoxylation varies between 10 and 80.

17. The method of claim 14 wherein non-ionic the breaking surfactant is added in solid form, solution, emulsion, encapsulated or as a suspension or emulsion of the encapsulated form.

18. The method of claim 1 wherein the anionic surfactant comprises compounds of formulae I.a and I.b.

19. The method of claim 18 wherein the anionic surfactant is comprised of at least about 50% compounds of formula I.a.

20. The method of claim 19 wherein the anionic surfactant is comprised of a mixture of $C_{16}$-$C_{18}$-alkyl-(O—$(CH_2)_2)_4$—OP(=O)(OH)$_2$ and [($C_{16}$-$C_{18}$-alkyl-(O—$(CH_2)_2)_4$)—O]$_2$—P(=O)(OH).

21. The method of claim 1 wherein the polymer comprises a hydrophilic bridging group and at least two hydrophobic groups.

22. The method of claim 21 wherein each hydrophobic group comprises a linear or branched $C_{12}$-$C_{22}$-alkyl, $C_{12}$-$C_{22}$-alkenyl or 2-hydroxy($C_{12}$-$C_{22}$-alk-1-yl).

23. The method of claim 21 wherein each hydrophilic bridging group comprises hydrophilic units comprising polyether and/or polyvinyl alcohol.

24. The method of claim 23 wherein the hydrophilic units comprises —[(O—$(CH_2)_2)_{y1}$(O—$CH(CH_3)CH_2)_{y2}$]— in which the sequence of the alkyleneoxy units is as desired and $y^1$ and $y^2$ are each independently an integer from 0 to 300, where the sum of $y^1$ and $y^2$ is from 10 to 300.

25. The method of claim 24 wherein the hydrophilic units are linked by multivalent gamma bridging units.

26. The method of claim 21 wherein the polymer has a molecular weight of between about 3000 to about 50,000 g/mol.

27. The method of claim 1 wherein the fluid further comprises a non-ionic surfactant.

28. The method of claim 27 wherein the non-ionic surfactant comprises compounds of formula (IV)

$$R^3—[(O(CH_2)_2)_{z1}(OCH(CH_3)CH_2)_{z2}]—OH \quad (IV)$$

in which:
the sequence of the alkyleneoxy units is as desired,
$R^3$ is selected from $C_{12}$-$C_{22}$-alkyl, $C_{12}$-$C_{22}$-alkenyl, $C_{12}$-$C_{22}$-alkynyl, ($C_{11}$-$C_{21}$-alkyl)-carbonyl, ($C_{11}$-$C_{21}$-alkenyl)carbonyl and ($C_{11}$-$C_{21}$-alkynyl)carbonyl, and
$z^1$ and $z^2$ are each independently an integer from 0 to 20, where the sum of $z^1$ and $z^2$ is from 1 to 20.

29. The method of claim 28 in which the $R^3$ radicals have on average at most one branch.

30. The method of claim 29 in which the $R^3$ radicals are each independently selected from palmityl, stearyl, oleyl, linoleyl, arachidyl, gadoleyl, behenyl, erucyl, isostearyl, 2-hexydecyl, 2-heptyldecyl, 2-heptylundecyl and 2-octyldodecyl.

31. The method of claim 30 wherein the sum of $z^1$ and $z^2$ is from 1 to 10.

32. The method of claim 31 wherein the sum of $z^1$ and $z^2$ is from 3 to 9.

33. A method of fracturing a subterranean formation penetrated by a wellbore, comprising the step of formulating a fracturing fluid comprising micelles networked by a polymer comprising at least one hydrophilic group and at least one hydrophobic component, and pumping the fracturing fluid down the wellbore at a rate and pressure sufficient to initiate or extend a fracture in the formation, wherein the micelles are formed by:

a. an anionic surfactant comprising a compound of formulae I.a to I.f or salts thereof, or mixtures thereof:

(I.a)

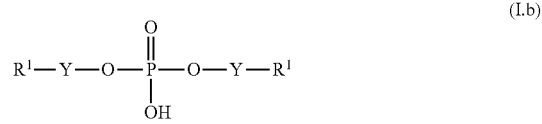
(I.b)

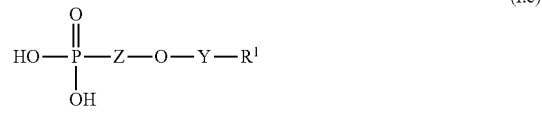
(I.c)

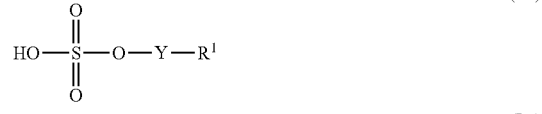
(I.d)

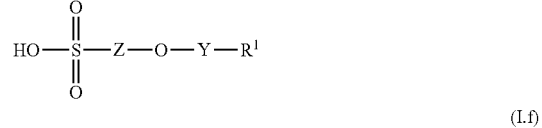
(I.e)

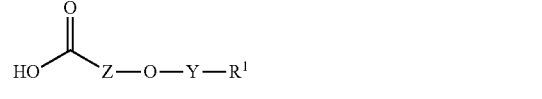
(I.f)

in which:
$R^1$ is selected from linear or branched $C_{16}$-$C_{22}$-alkyl, $C_{16}$-$C_{22}$-alkenyl, $C_{16}$-$C_{22}$-alkynyl, ($C_{15}$-$C_{21}$-alkyl)carbonyl, ($C_{15}$-$C_{21}$-alkenyl)carbonyl and ($C_{15}$-$C_{21}$-alkynyl)carbonyl,
Y is a group consisting of from 1 to 20 alkyleneoxy units and
Z is $C_1$-$C_4$-alkylene, and b. optionally, a nonionic surfactant, wherein the total amount of anionic surfactant, nonionic surfactant and polymer forms about 0.1 to about 30% by weight of the fracturing fluid, and the concentration of the polymer is less than the overlap concentration of the polymer and breaking the viscosity by adding a breaker, wherein the breaker is an alkaline material, an alkaline material precursor, or a nonionic breaking surfactant.

34. The method of claim 33 wherein the pH of the fracturing fluid is adjusted to less than about 5.

35. The method of claim 33 wherein the ratio of surfactant to polymer is between about 1:1 and about 100:1.

36. The method of claim 35 wherein the ratio of surfactant to polymer is about 9:1.

37. The method of claim 33 wherein the fracturing fluid is foamed prior to being pumped downhole.

38. The method of claim 33 wherein the regain permeability of the formation is at least about 50% after treatment with the fracturing fluid.

* * * * *